United States Patent [19]

Satoh

[11] Patent Number: 5,647,579

[45] Date of Patent: Jul. 15, 1997

[54] CONTROL TYPE VIBRO-ISOLATING SUPPORT

[75] Inventor: Shigeki Satoh, Chigasaki, Japan

[73] Assignee: Nissan Motor Co., Ltd., Yokohama, Japan

[21] Appl. No.: 622,414

[22] Filed: Mar. 27, 1996

[30] Foreign Application Priority Data

Mar. 31, 1995 [JP] Japan .................................. 7-076389

[51] Int. Cl.$^6$ .................................................. F16F 13/00
[52] U.S. Cl. .................................... 267/140.14; 364/508
[58] Field of Search ............................. 73/662, 663, 664, 73/665; 248/550, 562, 636; 267/140.13, 140.14, 219; 364/424.05, 507, 508; 180/312; 188/380; 318/128

[56] References Cited

U.S. PATENT DOCUMENTS

| | | | |
|---|---|---|---|
| 4,699,348 | 10/1987 | Freudenberg | 248/550 |
| 5,219,037 | 6/1993 | Smith et al. | 267/140.14 |
| 5,313,407 | 5/1994 | Tiernan et al. | 364/508 |
| 5,418,858 | 5/1995 | Shoureshi | 381/71 |
| 5,439,204 | 8/1995 | Yamazoe et al. | 267/140.14 |
| 5,456,341 | 10/1995 | Garnjost et al. | 248/550 |

*Primary Examiner*—Hezron E. Williams
*Assistant Examiner*—Rose M. Miller
*Attorney, Agent, or Firm*—Foley & Lardner

[57] ABSTRACT

A control type vibro-isolating support includes a pulse signal generator for generating reference signals x, which represent the state of the vibration being generated by an engine. An acceleration sensor detects residual vibration on the support member side, and generates a residual vibration signal e. A controller is supplied with the reference signals x and residual vibration signal e. On the basis of the reference signals x and residual vibration signal e and in accordance with, for example, synchronous filtered X LMS algorithm, the controller generates a drive signal y so as to lower the vibration level on the member side. An engine mount is interposed between the engine and the member, and has an electromagnetic actuator. The drive circuit for the actuator is supplied with the drive signal y. The controller judges that abnormality has occurred, if a maximum value of the residual vibration signal e exceeds a threshold, and if maximum values of the signal e have occurred at the same periodicity as the reference signals x.

20 Claims, 16 Drawing Sheets

CONTROL TYPE VIBRO-ISOLATING SUPPORT

FIELD AND BACKGROUND OF THE INVENTION

This invention relates to apparatus for supporting a vibrator such as a car engine on a support body such as a car body. In particular, the invention relates to a control type vibro-isolating support, that can generate controlling force depending on the conditions in which vibration is generated by a vibrator and transmitted to a support body. Abnormality in the vibro-isolating support can be detected for use to make the system more reliable.

A conventional vibro-isolating support of this type is disclosed in Japanese Patent Laid Open No. H.3-24,338, for example. This prior art includes a supporting elastic body interposed between a vibrator and a support body. The elastic body partially defines a fluid chamber, which is filled with fluid. An elastic body supports a movable plate so that the plate can change the volume of the chamber. An electromagnetic actuator includes a permanent magnet and an electromagnet. The actuator can properly displace the movable plate so as to change the volume of the chamber. The volume change elastically deform the elastic body in the expanding direction. This generates controlling force which can cancel the vibration transmitted to the vibro-isolating support.

Specifically, the electromagnetic actuator attracts the movable plate to a specified neutral position, where the supporting force of the elastic body, which supports the plate, balances with the magnetic force of the permanent magnet. Proper adjustment of the magnetic force generated by the electromagnet increases or decreases the magnetic force applied to the plate. It is therefore possible to change the clearance between the plate and the actuator to any value within a possible range, thereby varying the volume of the fluid chamber.

Conventional control type vibro-isolating supports such as mentioned above, however, include no means for detecting their own trouble, degradation or other abnormality. In order for the apparatus to be sufficiently reliable, there is a need to use highly durable members or parts, which make the trouble or degradation offer no problem, but are expensive.

SUMMARY OF THE INVENTION

In view of the problem in the prior art, it is the object of the present invention to provide a control type vibro-isolating support which can efficiently detect trouble, degradation or other abnormality without needing highly durable and expensive members.

The first invention is a control type vibro-isolating support comprising: a source of control vibration which is interposed between a vibrator and a support body, and which can generate control vibration; reference signal generation means for detecting the state of the vibration being generated by the vibrator, and for outputting a reference signal; residual vibration detection means for detecting residual vibration on the support body side, and for outputting a residual vibration signal; control means for generating a drive signal for driving the source of control vibration on the basis of the reference signal and the residual vibration signal so as to damp the vibration on the support body side; state detection means for detecting the state of the vibro-isolating support; and abnormality judgment means for judging if there is abnormality on the basis of the detection result of the state detection means.

The second invention is a control type vibro-isolating support according to the first invention, and further comprising: alarm raising means for raising an alarm if the abnormality judgment means judges abnormality occurring.

The third invention is a control type vibro-isolating support according to each of the first invention and second invention, wherein: the vibrator generates periodic vibration.

The 4th invention is a control type vibro-isolating support according to the third invention, wherein: the state detection means comprises maximum/minimum detection means for detecting the maximum or minimum value of the residual vibration signal for each cycle of the reference signal, and wherein: the abnormality judgment means judges if there is abnormality on the basis of the magnitude of the maximum or minimum value and the intervals at which the maximum or minimum values of the residual vibration signal have occurred for cycles of the reference signal.

The 5th invention is a control type vibro-isolating support according to the 4th invention, wherein: the abnormality judgment means judges abnormality occurring if the modulus (absolute value) of the maximum or minimum value exceeds a specified threshold and if the maximum or minimum values have periodically occurred.

The 6th invention is a control type vibro-isolating support according to the 4th invention, wherein: the abnormality judgment means judges abnormality occurring if the modulus of the maximum or minimum value exceeds a specified threshold and if the maximum or minimum values have occurred at the same cycle as the reference signal.

The 7th invention is a control type vibro-isolating support according to each of the third invention through 6th invention, wherein: the state detection means comprises auto-correlation function operation means for finding the auto-correlation function of the residual vibration signal with a time lag which is an integral number of times as long as the period of the reference signal, and wherein: the abnormality judgment means judges if there is abnormality on the basis of the auto-correlation function.

The 8th invention is a control type vibro-isolating support according to the 7th invention, wherein: the abnormality judgment means judges abnormality occurring if the auto-correlation function exceeds a specified threshold.

The 9th invention is a control type vibro-isolating support according to each of the third invention through the 8th invention, wherein: the state detection means comprises cross-correlation function operation means for finding the cross-correlation function of the residual vibration signal and the drive signal, and wherein: the abnormality judgment means judges if there is abnormality on the basis of the cross-correlation function.

The 10th invention is a control type vibro-isolating support according to the 9th invention, wherein: the abnormality judgment means judges abnormality occurring if the cross-correlation function exceeds a specified threshold.

The 11th invention is a control type vibro-isolating support according to each of the 9th invention and 10th invention, wherein: the abnormality judgment means judges abnormality occurring, which is higher-order divergence, if the cross-correlation function exceeds a specified threshold at a plurality of points within a time lag of which the maximum value is the period of the reference signal.

The 12th invention is a control type vibro-isolating support according to each of the first invention through the 11th invention, wherein: the source of control vibration comprises a supporting elastic body interposed between the vibrator and the support body, a diaphragm, a movable member which can be magnetized and is elastically supported so as to form part of the diaphragm, a fluid chamber defined at least partially by the elastic body and the diaphragm, fluid in the chamber, and an electromagnetic actuator for operation in response to the drive signal to displace the movable member so as to change the volume of the chamber.

The 13th invention is a control type vibro-isolating support according to the 12th invention, wherein: the state detection means comprises clearance detection means for detecting the clearance between the movable member and the electromagnetic actuator, and wherein: the abnormality judgment means judges if the source of control vibration is abnormal on the basis of the clearance.

The 14th invention is a control type vibro-isolating support according to the 13th invention, wherein: the electromagnetic actuator includes an exciting coil, and wherein: the clearance detection means comprises induced voltage detection means for detecting voltage induced under no control in the coil if the vibrator vibrates and if the actuator is not supplied with the drive signal.

The 15th invention is a control type vibro-isolating support according to the 14th invention, wherein: the abnormality judgment means judges that abnormality has occurred, which is decrease in the clearance, in the source of control vibration if the maximum or minimum value of the voltage induced under no control exceeds a specified value.

The 16th invention is a control type vibro-isolating support according to each of the 14th invention and 15th invention, wherein: the abnormality judgment means judges that abnormality has occurred, which is increase in the clearance, in the source of control vibration if the maximum or minimum value of the voltage induced under no control is less than a specified value.

The 17th invention is a control type vibro-isolating support according to each of the 12th invention through the 16th invention, wherein: the electromagnetic actuator comprises an exciting coil, and wherein: the state detection means comprises induced voltage detection means for detecting voltage induced under no control in the coil if the vibrator vibrates and if the actuator is not supplied with the drive signal, the abnormality judgment means judging the source of control vibration abnormal if the voltage induced under no control is zero.

The 18th invention is a control type vibro-isolating support according to each of the 12th invention through the 17th invention, wherein: the electromagnetic actuator includes an exciting coil, and wherein: the state detection means comprises maximum current value detection means for detecting the maximum value of the control current actually flowing through the coil, the abnormality judgment means judging the actuator in a high temperature state if the maximum value of the control current is less than a specified threshold.

The 19th invention is a control type vibro-isolating support according to the 18th invention, and further comprising control current correction means for lowering the maximum value of the control current if the abnormality judgment means judges the electromagnetic actuator in a high temperature state.

The 20th invention is a control type vibro-isolating support according to each of the 12th invention through the 19th invention, wherein: the source of control vibration has an orifice and an auxiliary fluid chamber of variable volume, which communicates through the orifice with the first-mentioned fluid chamber, and wherein: the chambers and the orifice are filled with the fluid.

In the first invention, the state detection means detects the states of means and signals of the control type vibro-isolating support. On the basis of the detection results, the abnormality judgment means judges if there is trouble, degradation or other abnormality. It is therefore possible to recognize the abnormality without needing to make the means of highly durable and expensive parts. For example, it is possible to positively stop the operation of the vibro-isolating support before the support completely fails.

In the second invention, the alarm raising means raises an alarm in response to abnormality occurring.

If the vibrator generates periodic vibration, as in the third invention, it is possible to judge if there is abnormality by detecting the states of the residual vibration signal and the drive signal, as in the 4th invention through 9th invention, which is described below in detail. In other words, it is possible to judge if there is abnormality by only monitoring the signals required for vibration damping control, without needing a new sensor.

For example, in the 4th invention, the magnitude of each maximum or minimum value of the residual vibration signal detected by the maximum/minimum detection means as the state detection means, that is, the level of the residual vibration signal must be low if the vibration damping control is well executed so that the vibration is canceled by the control vibration generated by the source of control vibration. It can be considered that, if the residual vibration signal level is high, either vibration generated by something but the vibrator is inputted into the support body, or the source of control vibration, the control by the control means, or something is abnormal so that the vibration damping control is not well executed.

In the former case, where nothing is abnormal, but the residual vibration signal level is high, the maximum or minimum values of the residual vibration signal are determined by the disturbance vibration transmitted from something but the vibrator. If the disturbance vibration is random vibration, its maximum or minimum values occur at random intervals. Even if the disturbance vibration is periodic vibration, the maximum/minimum value detection means finds the maximum or minimum value of the residual vibration signal in each cycle of the reference signal. Accordingly, if the cycle of the disturbance vibration does not coincide with that of the reference signal (that is, the cycle of the vibration generated by the vibrator), the maximum or minimum values cannot periodically occur.

The abnormality judgment means can therefore judge if there is abnormality, on the basis of the magnitude of the maximum or minimum values of the residual vibration signal detected by the maximum/minimum value detection means and the intervals at which the values have occurred.

In the 5th invention, the abnormality judgment means judges if the specified threshold is exceeded by each of the maximum or minimum values detected by the maximum/minimum value detection means, and if the values have periodically occurred. Therefore, if it is judged that the values exceed the threshold and they have periodically occurred, it can be considered that there is abnormality.

In the 6th invention, the abnormality judgment means judges if the specified threshold is exceeded by each of the maximum or minimum values detected by the maximum/minimum value detection means, and if the values have occurred at the same cycle as the reference signal. This completely distinguishes the condition where most of the vibration of the vibrator is transmitted to the support body side without being damped, even though the vibration damping control is executed.

In the 7th invention, the auto-correlation function of the residual vibration signal computed by the auto-correlation function operation means as the state detection means has the time lag τ as its variable which is an integral number of times as long as the period T of the reference signal (τ=T, 2T, 3T...). Therefore, if the residual vibration signal is periodic in synchronism with the reference signal, the auto-correlation function increases. If not, the function decreases. The period of the reference signal is nothing but the period of the vibration generated by the vibrator. It can therefore be considered that, if the residual vibration signal is judged periodic synchronously with the reference signal, components of the vibration generated by the vibrator are transmitted to the support body. This is a case where the vibration is not damped even though the vibration damping control is executed. The abnormality judgment means can therefore judge if there is abnormality on the basis of the auto-correlation function of the residual vibration signal found by the auto-correlation function operation means.

In the 8th invention, the abnormality judgment means judges if the specified threshold is exceeded by the auto-correlation function found by the auto-correlation function operation means. If the threshold is judged to be exceeded, it can be considered that there is abnormality.

In the 9th invention, the cross-correlation function detected by the cross-correlation function detection means as the state detection means is the cross-correlation function of the residual vibration signal and the drive signal. The fact that the cross-correlation function is large means that the control vibration generated by the source of control vibration is detected as the residual vibration. This is a case where the vibration damping control is not normally executed. Besides, no vibration generated by something but the vibrator and inputted into the support body influences the cross-correlation function of the residual vibration signal and the drive signal.

In the 10th invention, the abnormality judgment means judges if the specified threshold is exceeded by the cross-correlation function found by the cross-correlation function operation means. If the threshold is judged to be exceeded, it can be considered that there is abnormality.

If the cross-correlation function of the residual vibration signal and the drive signal found by the cross-correlation function operation means has two or more peak values within a time lag of which the maximum value is the period of the reference signal, it can be considered that the drive signal contains (higher) harmonic components of the reference signal, which influence the residual vibration signal.

Therefore, if, as in the 11th invention, the abnormality judgment means judges that the specified threshold is exceeded by the cross-correlation function of the residual vibration signal and the drive signal at a plurality of points within a time lag τ of which the maximum value is the period T of the reference signal (τ=0 to T), it can be considered that there is abnormality which is higher-order divergence.

In the 12th invention, the source of control vibration of each of the first invention through 11th invention is a source of control vibration of the type filled with fluid. Specifically, the elastic body defines the fluid chamber, which is filled with the fluid. This is equivalent to two spring elements interposed in parallel between the vibrator and support body. One of the elements is the support spring by the elastic body. The other element is the expansion spring by the elastic deformation in the expanding direction of the elastic body due to the change in volume of the fluid chamber.

If the movable member is displaced by the magnetic force generated by the electromagnetic actuator, the volume of the fluid chamber changes, elastically deforming the expansion spring. This generates controlling force of the magnitude which is the multiplication product of the spring constant and the amount of deformation of the expansion spring.

Therefore, by properly controlling this magnetic force generated by the actuator, it is possible to apply active force between the vibrator and support body. The active force interferes with the vibration input from the vibrator side. Consequently, if the control means properly generates a drive signal, and if the signal is supplied to the actuator, the controlling force cancels the vibration transmitted from the vibrator side to the support body side, thereby damping the vibration level on the support body side.

It is important for such a source of control vibration to keep the clearance between the movable member and electromagnetic actuator a proper value, in order to generate precise controlling force. The clearance may, however, be varied from the initial proper value by degradation of the member supporting the movable member, demagnetization of the permanent magnet, or the like.

In the 13th invention, the clearance detection means detects the clearance between the movable member and electromagnetic actuator. On the basis of the detected clearance, the abnormality judgment means judges if there is abnormality.

The clearance between the movable member and electromagnetic actuator may be detected from the output of a gap sensor. However, if the actuator includes a yoke, an exciting coil and a permanent magnet, and when the movable member of magnetizable material is displaced, voltage is induced between both terminals of the coil. The induced voltage changes in magnitude with the clearance.

Therefore, if, as in the 14th invention, the apparatus has induced voltage detection means, the clearance between the movable member and electromagnetic actuator can be detected easily as the induced voltage of the exciting coil. The reason is that, if no vibration is generated by the vibrator, the movable member is vibrated by the change in volume of the fluid chamber due to the vibration input into the elastic body, and, if the actuator is supplied with no drive signal, the voltage between both ends of the coil remains the induced voltage (voltage induced under no control).

The voltage induced under no control increases as the clearance between the movable member and electromagnetic actuator decreases, and vice versa. It is considered that the vibration amplitude of the movable member is constant if the vibrator vibrates in the same condition. Therefore, by properly selecting the timing of detection of the voltage induced under no control, it can be judged that abnormality has occurred. The abnormality is decrease in the clearance if the maximum or minimum value of the voltage exceeds a threshold, as in the 15th invention. The abnormality is increase in the clearance if the value is below the threshold, as in the 16th invention.

In the 17th invention, the induced voltage detection means as the state detection means must detect any value of the voltage induced under no control if the circuit including the exciting coil of the electromagnetic actuator is not disconnected, broken or otherwise abnormal. If no such voltage is detected, the abnormality judgment means can judge the source of control vibration abnormal.

An eddy current flows in the movable member particularly at a higher frequency, so that the impedance of the exciting coil increases. Therefore, if the input voltage into the drive circuit for the coil is constant, the maximum value of the current flowing actually through the coil is determined. The maximum current value, however, tends to lower as well if the coil temperature rises and its impedance increases. In the 18th invention, the maximum current value detection means as the state detection means detects the maximum value of the control current flowing actually through the coil. This enables the abnormality judgment means to judge the electromagnetic actuator, inclusive of the coil, to be hot if the maximum value is below the specified threshold.

In the 19th invention, the control current correction means lowers the maximum value of the control current if the abnormality judgment means judges the electromagnetic actuator hot. The maximum value is lowered so as to either make the actuator out of its hot state, or prevent it from being even hotter.

In the 20th invention, the orifice interconnects the fluid chamber and the auxiliary fluid chamber of variable volume. Therefore, in such a condition that vibration of a frequency at which the fluid can move through the orifice between the chambers is inputted, the apparatus operates as a vibro-isolating support of the type filled with fluid which generates passive supporting force. Then, for example, if the frequency at which the damping of the fluid resonance system with the fluid in the orifice as its mass and with the spring in the expanding direction of the elastic body and the diaphragm defining the auxiliary fluid chamber as its spring is maximum is made substantially equal to the frequency of a particular vibration (particularly of large amplitude) generated by the vibrator, either there is no need for the electromagnetic actuator to operate, or the actuator needs to generate only small controlling force, when the particular vibration is generated.

BRIEF EXPLANATION OF THE DRAWINGS

Preferred embodiments of the present invention are described below with reference to the accompanying drawings, in which.

DETAILED DESCRIPTION OF THE INVENTION

Figure 1:
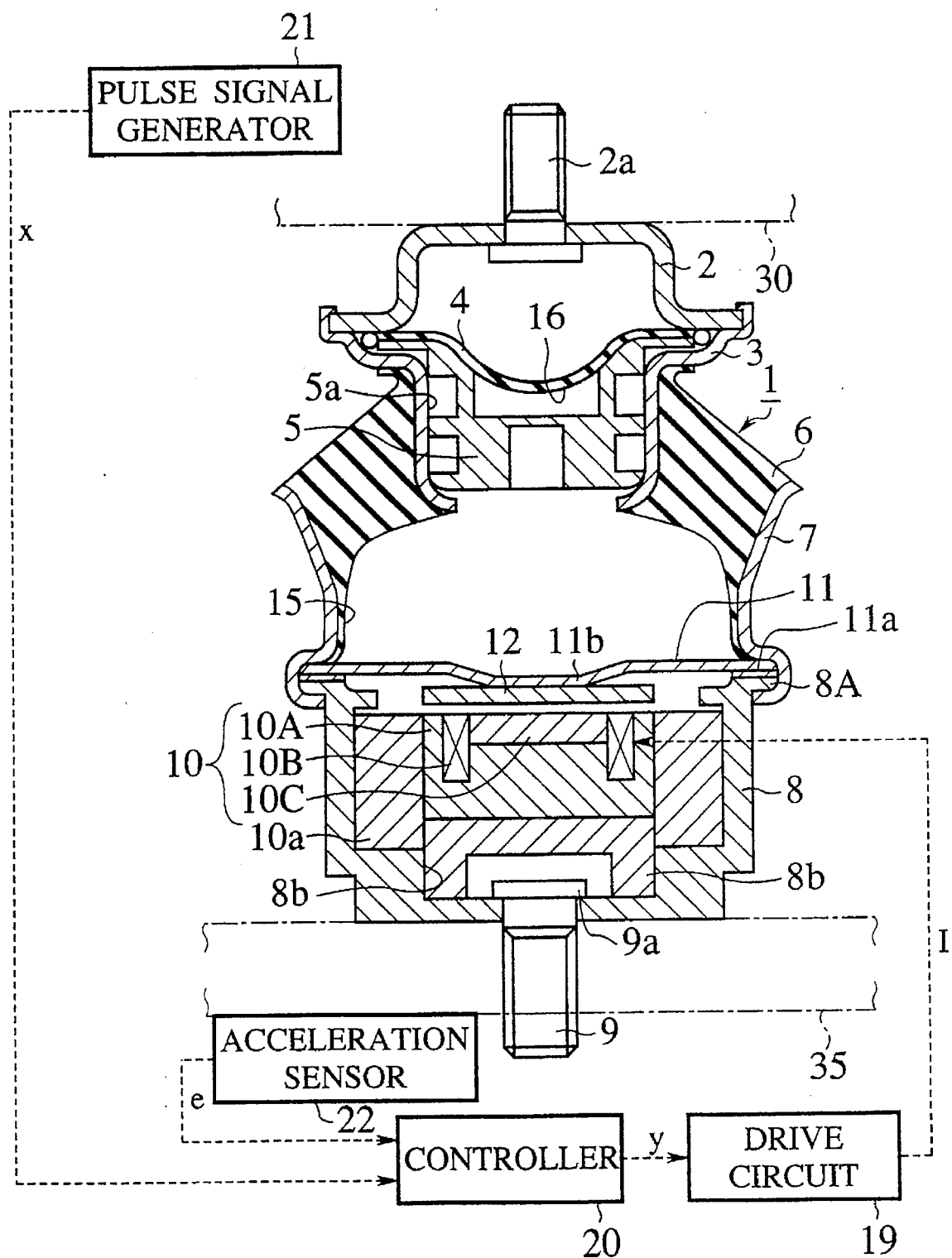
FIG. 1 is a schematic view in axial cross section showing the whole setup of the first embodiment.

FIG. 1 shows the setup of the first embodiment, which is a control type vibro-isolating support applied to an active engine mount 1 for actively damping the vibration transmitted from an engine 30 to the car body supporting the engine.

The engine mount 1 as a source of control vibration is generally cylindrical and has a vertical axis. The engine mount 1 includes a fitting member 2. Fixed to the top of fitting member 2 is a bolt $2a$ for fitting to the engine 30 as a vibrator, which generates periodic vibration. The fitting member 2 has a cylindrical wall, an open bottom and a bottom flange. Caulked to the periphery of the flange is the top of an inner tube 3. The fitting member 2 and inner tube 3 define a cylindrical space inside them.

The inner tube 3 surrounds the periphery of a circular diaphragm 4, which partitions the cylindrical space into an upper and a lower spaces. The periphery of diaphragm 4 is gripped or held under the caulked portions of parts 2 and 3. The upper space over the diaphragm 4 opens to the atmospheric pressure, while the lower space contains an orifice-defining body 5.

The inner surface of a cylindrical supporting elastic body 6 is bonded by curing or vulcanization to the outer surface of inner tube 3. The inner surface of the elastic body 6 is positioned axially higher than the outer surface of it. The outer surface of the elastic body 6 is bonded by curing to the inner surface of an outer tube 7.

The bottom of outer tube 7 is caulked to the top flange 8A of a cylindrical actuator case 8, which is open at the top and closed at the bottom. From this bottom projects a bolt 9 for fitting to a support member 35. The case 8 has a bottom bore $8a$, in which the bottom of a cylindrical cap $8b$ is fitted. The head $9a$ of bolt 9 is located in the bottom space of cap $8b$.

The actuator case 8 also contains an electromagnetic actuator 10 fitted coaxially with it. The actuator 10 includes a cylindrical yoke 10A, which is fixed to the top of cap $8b$, and which has an open top space formed in it. An annular exciting coil 10B is fitted in this top space and wound with its axis directed vertically. A circular permanent magnet 10C is fixed to the top of the portion of yoke 10A which is surrounded by the coil 10B. The poles of permanent magnet 10C face upward and downward, respectively. An adapter 10a is interposed between the inner surface of case 8 and the outer surface of actuator 10 to fix the actuator 10.

A circular flat spring 11 of metal is fitted over the open top of case 8. The periphery 11a of flat spring 11 is gripped together with the flange 8A by the caulked bottom of outer tube 7. A magnetic path member 12 in the form of a disc is fixed with rivets (not shown) or the like to the lower side of the center 11b of flat spring 11. The magnetic path member 11 is made of iron or other material which can be magnetized. The magnetic path member 12 is spaced with a specified clearance from the top of electromagnetic actuator 10. The flat spring center 11b and magnetic path member 12 constitute movable members of the invention.

The lower surface of supporting elastic body 6 and the upper surface of flat spring 11 partially define a fluid chamber 15. The diaphragm 4 and orifice-defining body 5 define an auxiliary fluid chamber 16. The orifice-defining body 5 has orifices 5a formed in it, through which the chambers 15 and 16 communicate. The chambers 15 and 16 and orifices 5a are filled with oil or other fluid.

The characteristics of the fluid mount, which depend on the flow passage shape etc. of orifices 5a, are adjusted so that the spring constant and the damping force are high when an engine shake occurs while the car is running, that is to say, when the engine mount 1 is vibrated at 5–15 Hz.

The exciting coil 10B of electromagnetic actuator 10 is connected through a harness (not shown) to a drive circuit 19, which may include an H-type bridge circuit. The drive circuit 19 is connected through a harness (not shown) to a controller 20. The drive circuit 19 can supply the coil 10B with control current I in the direction and of the magnitude in accordance with the drive signal y from the controller 20.

The controller 20 may include a microcomputer, an interface circuit, an A/D converter and a D/A converter. The controller 20 can generate a drive signal y and supply it to the drive circuit 19 so that, if a vibration is inputted which is in the frequency band at which the fluid cannot move between the chambers 15 and 16 through the orifices 5a, that is to say, if an idle vibration, an internal sound vibration, or an accelerating vibration is inputted, which is a vibration higher in frequency than the engine shake, a control vibration having the same cycle as that vibration is generated in the engine mount 1, and the force of transmitting vibration to the support member 35 is "0" (more specifically, the controlling force obtained by the electromagnetic force of actuator 10 cancels the exciting force inputted into the engine mount 1 by the vibration on the engine 30 side).

In a reciprocating 4-cylinder engine, for example, idle vibration, internal sound vibration, etc. are caused mainly by the transmission of the engine vibration, which is the secondary component of the engine rotation, through the engine mount 1 to the support member 35. It is therefore possible to reduce the transmissibility of vibration by generating and outputting a drive signal y in synchronism with the secondary component of the engine rotation. In this embodiment, a pulse signal generator 21 is used as a reference signal generation means. This means generates impulse signals in synchronism with the rotation of the crank shaft of engine 30 (in a reciprocating 4-cylinder engine, for example, one impulse signal each time the crank shaft has rotated by 180 degrees), and outputs them as reference signals x. The controller 20 is supplied with the reference signals x as the signals representing the state of the vibration being generated by the engine 30.

Fixed to the support member 35 is an acceleration sensor 22, as a means of detecting residual vibration, near where the engine mount 1 is mounted. This means detects the state of the vibration of support member 35 in the form of acceleration, and outputs it as a residual vibration signal e. The controller 20 is supplied with the residual vibration signal e as the signal representing the vibration after interference.

The controller 20 generates and outputs a drive signal y based on the reference signals x and residual vibration signal e, in accordance with filtered X LMS algorithm, which is a kind of sequentially updated type adaptation algorithm, and more specifically, with synchronous filtered X LMS algorithm.

The controller 20 has an adaptive digital filter W with variable filter factors $W_i$ ($i=0, 1, 2, \ldots, I-1$, where I is the number of taps). The controller 20 outputs as a drive signal y the filter factors $W_i$ in order at intervals of specified sampling clock pulses from the point when the latest reference signal x is inputted. On the other hand, the controller 20 executes the process for properly updating the filter factors $W_i$ on the basis of the reference signals x and residual vibration signal e, so as to damp the vibration transmitted from the engine 30 through the engine mount 1 to the support member 35.

The updating expression for the adaptive digital filter W is the following expression (1) in accordance with the filtered X LMS algorithm.

$$W_i(n+1)=W_i(n)-\mu R^T e(n) \tag{1}$$

where the terms with "(n)" represent values at the time n; $\mu$ is a convergence factor related to the stability and the speed of convergence of filter factors $W_i$. Theoretically, $R^T$ is the value (reference signal or filtered X signal) of reference signals x filtered by a transfer function filter $C^\wedge$, which is a model of transfer function C between the electromagnetic actuator 10 and acceleration sensor 22. In this embodiment, because the reference signals x are a series of impulses as a result of the application of synchronous filtered X LMS algorithm, $R^T$ equals the sum at the time n of the impulse response waveforms when impulse responses of transfer function filter $C^\wedge$ are generated in succession in synchronism with the reference signals x.

Theoretically, the adaptive digital filter W filters the reference signals x to generate a drive signal y. Filtration corresponds to convolution operation as digital operation. The reference signals x are a series of impulses. Therefore, even if the filter factors $W_i$ of adaptive digital filter W are outputted in order as a drive signal y, at intervals of specified sampling clock pulses from the point when the latest reference signal x is inputted, as stated above, the result is the same with the case where the result of filtration is the drive signal y.

As explained later in detail with flowcharts, the controller 20 processes abnormality detection, which judges if the active engine mount is normal on the basis of residual vibration signal e. Specifically, in the abnormality detection process, the controller 20 stores in each cycle of reference signals x, that is to say, when each reference signal x is inputted, the maximum value $E_{max}$ of residual vibration signal e and the sampling time i when the maximum value $E_{max}$ has occurred. Then, the controller 20 compares the maximum value $E_{max}$ with the threshold $E_{th}$ by which the level of residual vibration signal e can be judged higher than when the vibration damping control is well executed. If the maximum value $E_{max}$ is larger, the vibration is not damped even though the vibration damping control is executed, so that it is judged that the engine mount 1 or something may have trouble, degradation or other abnormality. If it is judged that there may be such abnormality, then it is judged if the maximum values $E_{max}$ have periodically occurred on the basis of the sampling time, which is the time when the maximum values $E_{max}$ have occurred. If periodicity is found, then it is judged that something is abnormal.

If the controller 20 judges that abnormality is occurring, it inhibits the execution of the vibration damping control by means of the engine mount 1 (system down). At the same time, the controller 20 warns the operator of the occurrence of trouble, for example, at periodic inspection by turning on an alarm lamp 20B (FIG. 2) as alarm raising means. The alarm lamp 20B is an LED lamp, which is fitted on a side wall of case 20A of controller 20.

The operation of this embodiment is explained below.

When an engine shake occurs, the engine mount 1 functions as a support of a high dynamic spring constant and high damping force, as a result of the proper selection of the flow passage shape etc. of orifices 5a. Therefore, the engine mount 1 damps the engine shake generated at the engine 30, thereby lowering the vibration level on the support member 35 side. In such a case, it is not particularly necessary to displace the magnetic path member 12.

If a vibration is inputted which has a frequency higher than the idle vibration frequency, at which the fluid in the orifices 5a is in a stick state and no fluid can move between the chambers 15 and 16, the controller 20 processes a specified operation, outputs a drive signal y to the electromagnetic actuator 10, and makes the engine mount 1 generate an active controlling force, which can damp the vibration.

This is explained below in detail with reference to FIG. 3, which is a flowchart schematically showing the process executed in the controller 20 when an idle vibration or an internal sound vibration is inputted.

At step 101, specified initialization is made. Thereafter, the process goes to step 102, where the reference signal $R^T$ for one cycle is computed in a lump on the basis of transfer function filter $C^{\wedge}$.

Then, the process goes to step 103, where the count i of a counter is zeroed or cleared, and thereafter to step 104, where the ith filter factor $W_i$ of adaptive digital filter W is outputted as a drive signal y.

After the drive signal y is outputted at step 104, the process goes to step 105, where the residual vibration signal e is read and stored together with the present value of count i.

Next, the process goes to step 106, where the count j of a counter is zeroed, and then to step 107, where the jth filter factor $W_j$ is updated in accordance with the expression (1).

After completing the updating at step 107, the process goes to step 108, where it is judged if the next reference signal x has been inputted. If not, the process goes to step 109 for updating the next filter factor of adaptive digital filter W or outputting a drive signal y.

At step 109, it is judged if the count j exceeds the number of output times $T_y$ (precisely, $T_y$ minus 1 because the count j starts with 0). This judgment is for judging if the required number of filter factors $W_i$ of adaptive digital filter W have been updated as the drive signal y after the filter factor $W_i$ was outputted as the drive signal y at step 104. If the judgment at step 109 results in no, the count j is incremented at step 110. Then, the process returns to step 107 for repetition of steps.

If the judgment at step 109 results in yes, it can be judged that the required number of filter factors of adaptive digital filter W as the drive signal y have been updated. Then, the process goes to step 111, where the count i is incremented. Thereafter, the process waits until the time has passed which corresponds to the interval of the specified sampling clock pulses after the last processing at step 104. If the time has passed, the process returns to step 104 for repetition of steps.

If it is judged at step 108 that the reference signal x has been inputted, the process goes to step 112, where the count i (precisely, i plus 1 because the count i starts with 0) is stored as the latest number of output times $T_y$. Thereafter, the process returns to step 102 for repetition of steps.

Figure 3:
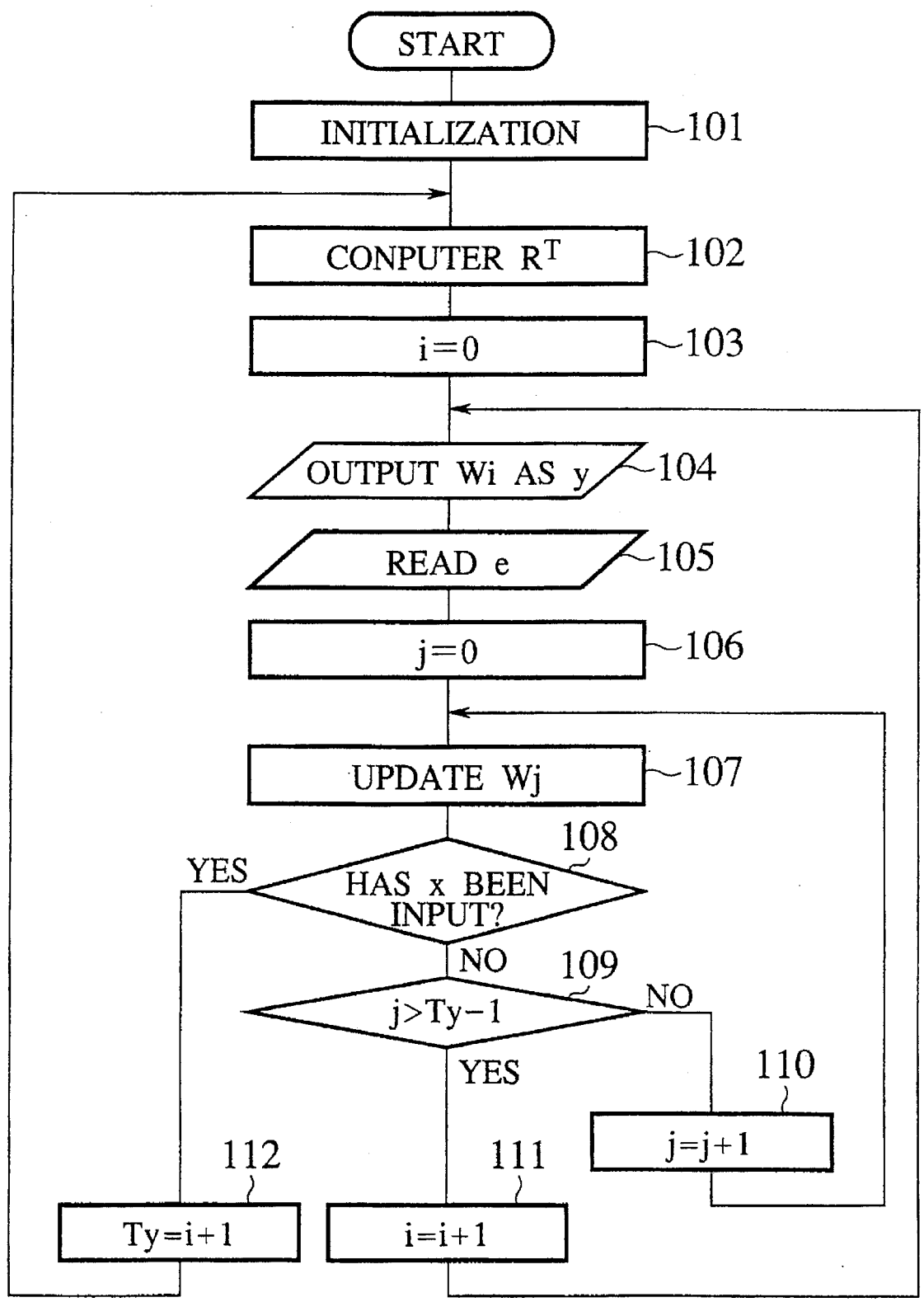
FIG. 3 is a flowchart of the vibration damping process executed in the controller.
Figure 4:
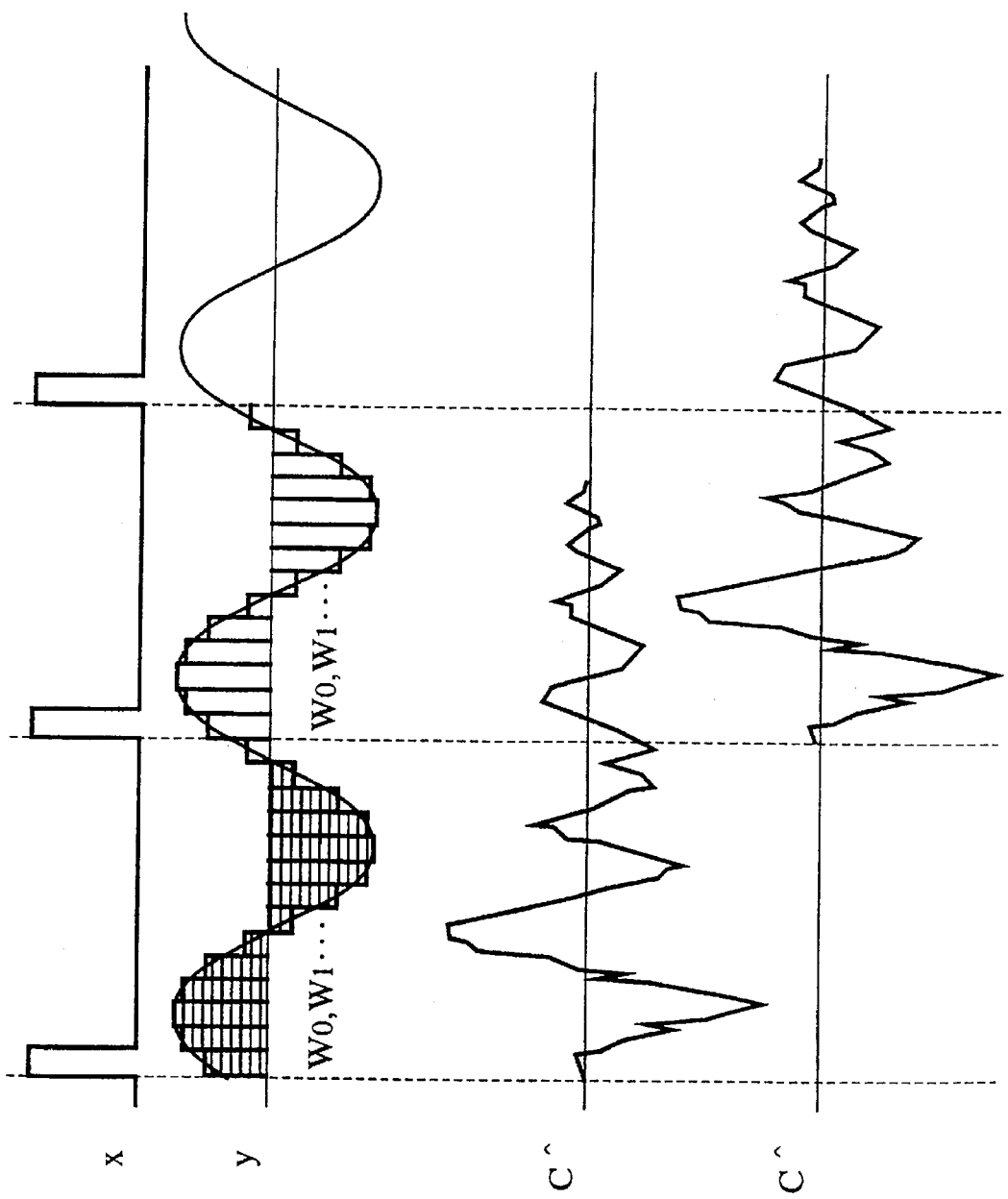
FIG. 4 shows wave forms of reference signals x, drive signal y and transfer function filter C^.

As a result of the repetition of steps in FIG. 3, the controller 20 supplies the drive circuit 19 with the filter factors $W_i$ of adaptive digital filter W in order as the drive signal y at intervals of the sampling clock pulses from the point when the reference signal x is inputted, as shown in FIG. 4, which shows the relations between the reference signals x, drive signal y and transfer function filter $C^{\wedge}$.

As a result, the drive circuit 19 makes the exciting coil 10B generate a magnetic force in proportion to the drive signal y. Because a constant magnetic force is already applied by the permanent magnet 10C to the magnetic path member 12, it can be considered that the magnetic force of the coil 10B acts to strengthen or weaken the magnetic force of permanent magnet 10C. In other words, when no drive signal y is supplied to the coil 10B, the magnetic path member 12 is displaced to the neutral position, where the supporting force of flat spring 11 and the magnetic force of permanent magnet 10C balance with each other. When the coil 10B is supplied with a drive signal y in the neutral condition, and if this signal makes the coil 10B generate a magnetic force in the opposite direction to that of permanent magnet 10C, the magnetic path member 12 is displaced so as to enlarge the clearance between it and the electromagnetic actuator 10. Contrariwise, if the magnetic forces of the coil 10B and permanent magnet 10C are in the same direction, the magnetic path member 12 is displaced so as to reduce the clearance between it and the actuator 10.

Thus, the magnetic path member 12 can be displaced in opposite directions. The displacement changes the volume of main fluid chamber 15. The change of volume deforms the expansion spring of the elastic body 6. This makes the engine mount 1 generate active supporting force in either direction. Each filter factor $W_i$ of adaptive digital filter W as a drive signal y is sequentially updated with the expression (1) in accordance with the synchronous filtered X LMS algorithm. Therefore, after the filter factors $W_i$ converge at the optimum value when some time has passed, the supply of drive signal y to the engine mount 1 damps the idle vibration, the internal sound vibration or the like transmitted from the engine 30 through the engine mount 1 to the support member 35.

The abnormality detection process is explained below with reference to the flowchart of FIG. 5. The process of FIG. 5 is executed as an interrupt process each time the step 112 of the vibration damping process of FIG. 3 is completed.

Figure 5:
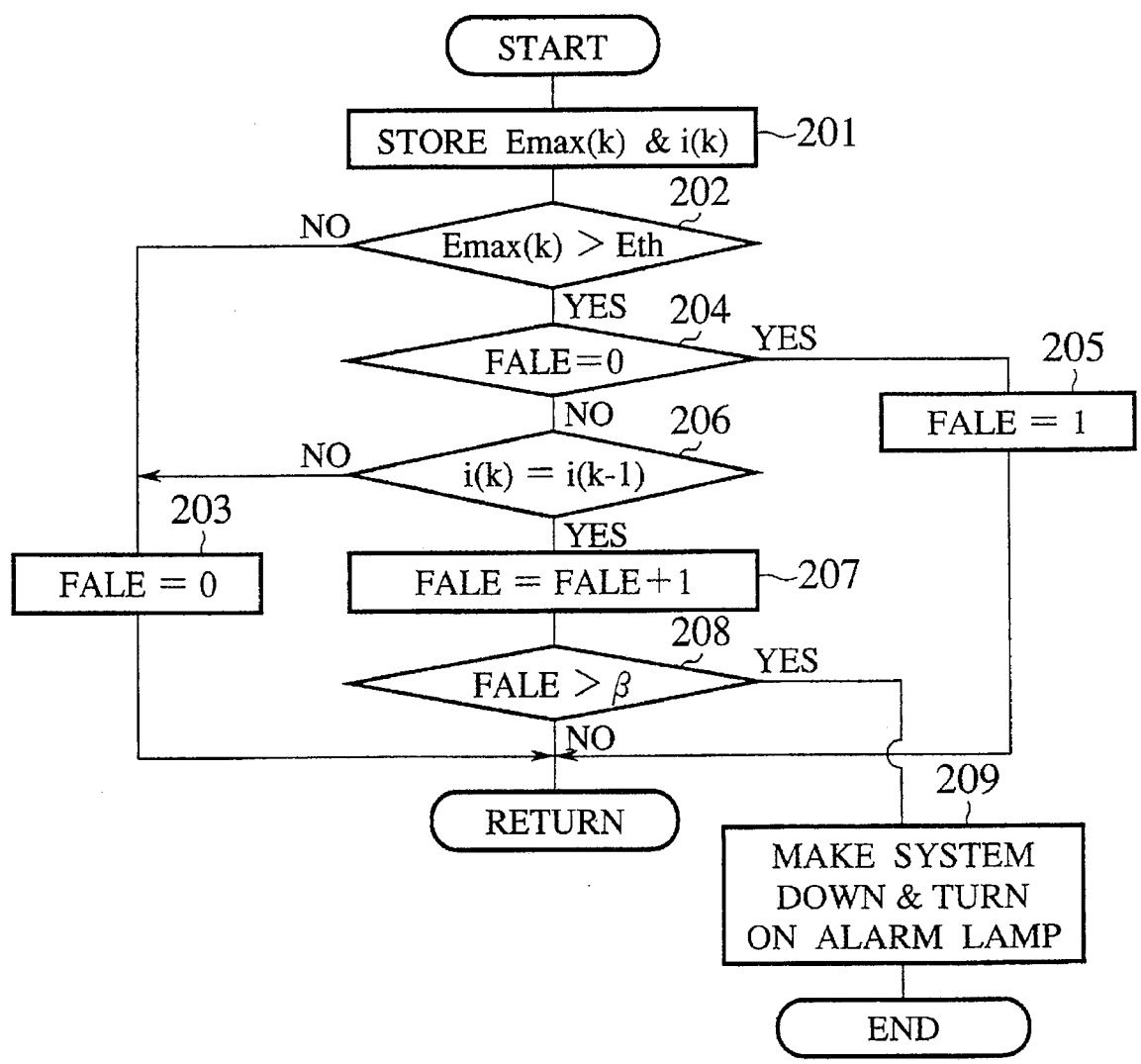
FIG. 5 is a flowchart of the abnormality detection process in the first embodiment.

First at step 201, the maximum value $E_{max}$ is selected from the residual vibration signal e in one cycle of reference signals x, which is stored in the process of FIG. 3, and then the maximum value $E_{max}$ and the sampling time i at which it has occurred are stored as $E_{max}(k)$ and i(k), respectively, corresponding to the variable k which represents the number of the times when the process of FIG. 5 is executed.

Figure 6:
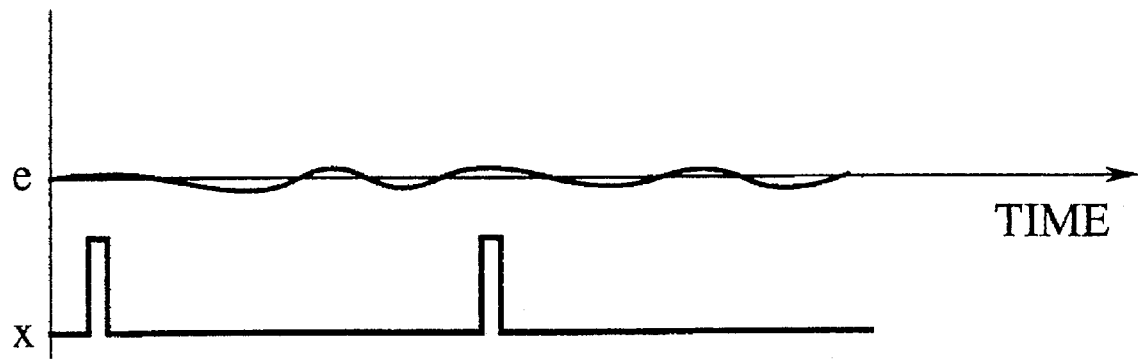
FIG. 6 shows wave forms of residual vibration signal e and reference signals x in the normal condition.

Next, the process goes to step 202, where it is judged if the threshold $E_{th}$ is exceeded by the maximum value $E_{max}(k)$ obtained at step 201. If the judgment results in no, the level of residual vibration signal e is low. It is therefore considered that, as a result of the vibration damping process of FIG. 3 sufficiently damping the vibration transmitted from the engine 30 to the support member 35, a residual vibration signal e as shown in FIG. 6 is obtained. It is therefore judged that no abnormality is occurring. Then, the process goes to step 203, where the count of a counter FALE is zeroed, which shows if there is abnormality. Thereafter, the abnormality detection process for this time ends.

If the judgment at step 202 results in yes, the level of residual vibration signal e is high. It can therefore be judged that, because the vibration on the support member 35 side is not sufficiently damped, the vibration damping control may not be normally working, that is to say, abnormality may be occurring.

Then, the process goes to step 204, where it is judged if the count of counter FALE is 0. If the count is 0, the maximum value $E_{max}$ exceeds the threshold $E_{th}$ for the first time. Because it is therefore not possible at this stage to judge if there is abnormality, the process goes to step 205, where the count of counter FALE is made 1. Thereafter, the abnormality detection process for this time ends.

In the subsequent abnormality detection processes, if the judgment at step 202 still results in yes, the judgment at step 204 results in no. Then, the process goes to step 206, where it is judged if the maximum values $E_{max}$ have periodically occurred. Particularly in this embodiment, it is judged if the maximum values $E_{max}$ have occurred at the same cycle as the reference signals x.

Figure 7:
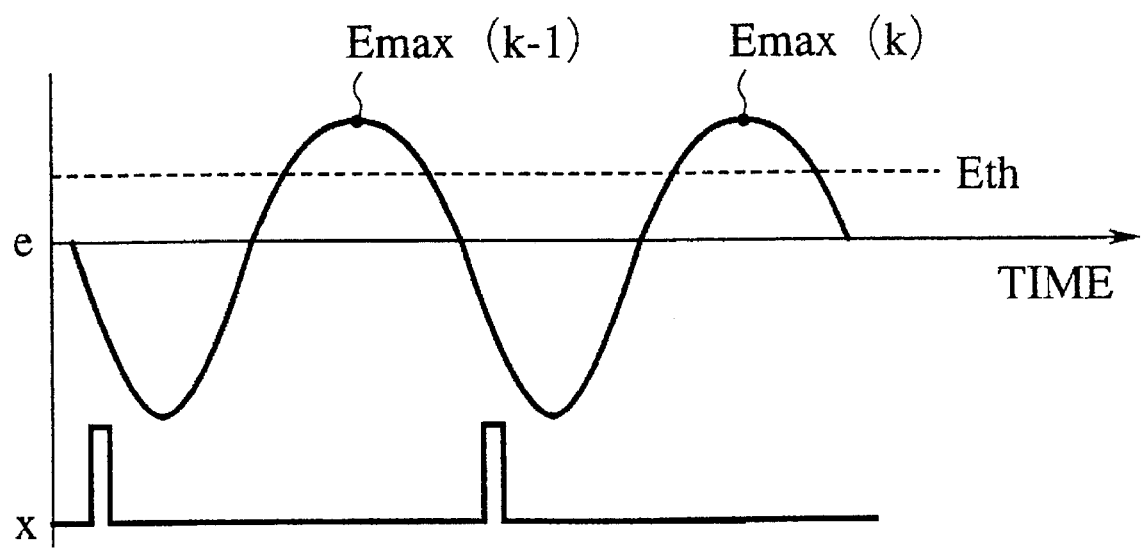
FIG. 7 shows wave forms of residual vibration signal e and reference signals x in the abnormal condition.

Specifically at step 206, it is judged if the sampling time i(k) stored at step 201 is identical with the sampling time i(k−1) also stored in the process for the last time. If the judgment at step 206 results in yes, it can be judged that a residual vibration signal e of a certain level has the same periodicity as the reference signals x, as shown in FIG. 7, for example.

Figure 8:
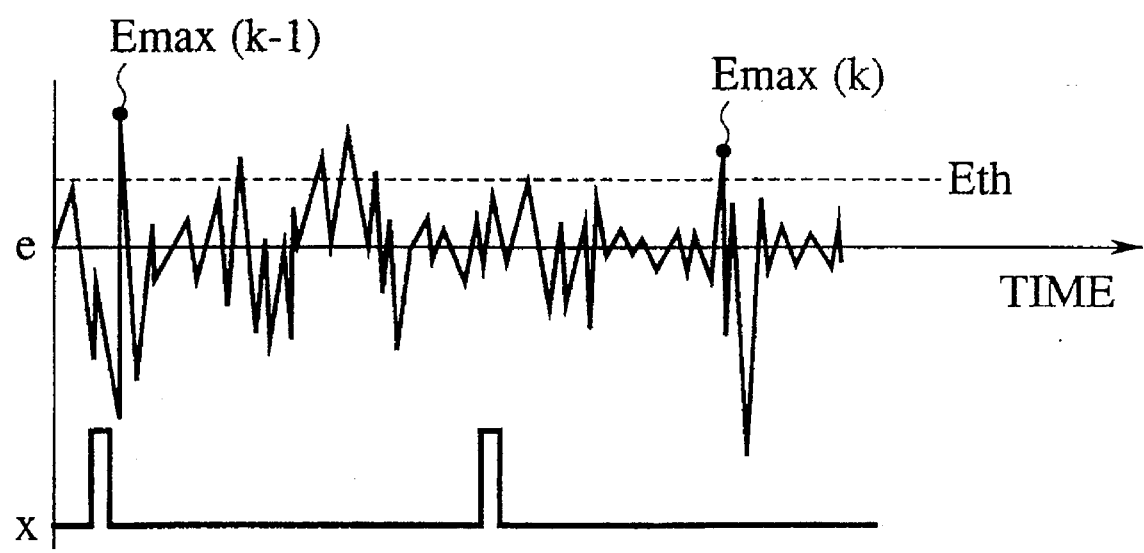
FIG. 8 shows wave forms of residual vibration signal e and reference signals x in the normal condition.

Contrariwise, if the judgment at step 206 results in no, it is certain that the level of residual vibration signal e is high, but it can be judged that there is no relation between the residual vibration signal e and reference signals x. This is true of such a case that, although the active engine mount is normal, the vibration inputted from the road surface to the support member 35 is detected by the acceleration sensor 22, and superimposed on the residual vibration signal e because, for example, the vehicle is running on a bad road or the like. In this case, the residual vibration signal e is such as shown in FIG. 8.

If the judgment at step 206 results in no, the process goes to step 203, where the counter FALE is zeroed. Thereafter, the abnormality detection process for this time ends.

If the judgment at step 206 results in yes, however, the residual vibration signal e and reference signals x probably have relation to each other. Then, the process goes to step 207, where the counter FALE is incremented. Next, the process goes to step 208, where it is judged if the count of counter FALE exceeds a specified number β, which may be 10, for example. If not, the abnormality detection process for this time ends as it is.

As stated above, it is not judged that abnormality is occurring immediately if the judgment at step 206 results in yes, because the abnormality detection process is made more reliable by avoiding the misjudgment that there is abnormality in such a case that the cycles of residual vibration signal e and reference signals x coincide accidentally.

Therefore, if the judgment at step 208 results in yes, it can be judged that the residual vibration signal e is periodic, and yet that its cycle coincides with the cycle of reference signals x. In such a case, although the vibration damping process of FIG. 3 is in execution, the vibration transmitted from the engine 30 through the engine mount 1 to the support member 35 is not sufficiently damped. It can therefore be judged that the engine mount 1 or something is abnormal. Then, the process goes to step 209, where the execution of the vibration damping process of FIG. 3 is inhibited to make the system down, and the alarm lamp 20B is turned on.

As a result, the operation of an active engine mount which is abnormal is avoided. This can avoid wrong operation which may cause worse vibration etc., so that the influence of the abnormality is minimum. With the function for thus judging if abnormality is occurring, it is possible to raise the reliability of the apparatus when the apparatus is actually used, without needing to use very durable and/or very expensive members or parts for avoiding possible abnormality.

If it is judged that abnormality is occurring, the alarm lamp 20B is turned on. If the controller 20 is located where the operator can see the alarm lamp 20B, he/she can immediately be warned of the abnormality. Even if the controller 20 is located where the operator cannot see the alarm lamp 20B, he/she can easily and certainly be informed at regular inspection etc. that the active engine mount is abnormal. It is thus possible to minimize the possibility that the abnormality is overlooked.

In this embodiment, it is possible to judge if there is abnormality on the basis of the state of residual vibration signal e. Therefore, there is no need of a new sensor other than the sensor necessary for damping vibration. This means that the costs are not greatly increase and the apparatus is not enlarged. The apparatus not enlarged is very desirable for a vehicle with a very limited mounting space.

The abnormality judgment process basically requires only the steps of finding a maximum value $E_{max}$ of residual vibration signal e by means such as simple subtraction, comparing the maximum value $E_{max}$ with the threshold $E_{th}$, comparing the sampling time i(k) with the sampling time i(k−1), incrementing the count of counter PALE and comparing it with the specified value β. This does not largely increase the operation load on the controller 20. Therefore, there is no need to use a microprocessor or the like for high speed operation, which is expensive, in order to realize the functions of this embodiment.

In this embodiment, it is judged if the maximum value $E_{max}$ exceeds the threshold $E_{th}$. If so, it is judged if the newest sampling time i(k) is identical with the last sampling time i(k−1). If it keeps judged for a certain time that i(k) and i(k−1) are identical, it is judged that abnormality is occurring. It is therefore possible to precisely judge how the engine vibration is transmitted to the support member 35 side, even though the vibration damping process is executed. In short, the possibility of false or wrong detection of abnormality is very low.

In this embodiment, it is judged if there is abnormality on the basis of maximum values $E_{max}$ of residual vibration signal e. As shown in FIG. 7, however, if the residual vibration signal e alternates in opposite directions, the judgment may be based on the minimum values instead of the maximum values.

In this embodiment, the process shown in FIG. 3 constitutes control means. The process of storing the residual vibration signal e and the sampling time i at step 105 and the processing at step 201 constitute maximum/minimum value detection means as state detection means. The processing at steps 202–208 constitutes abnormality detection means.

Figure 9:
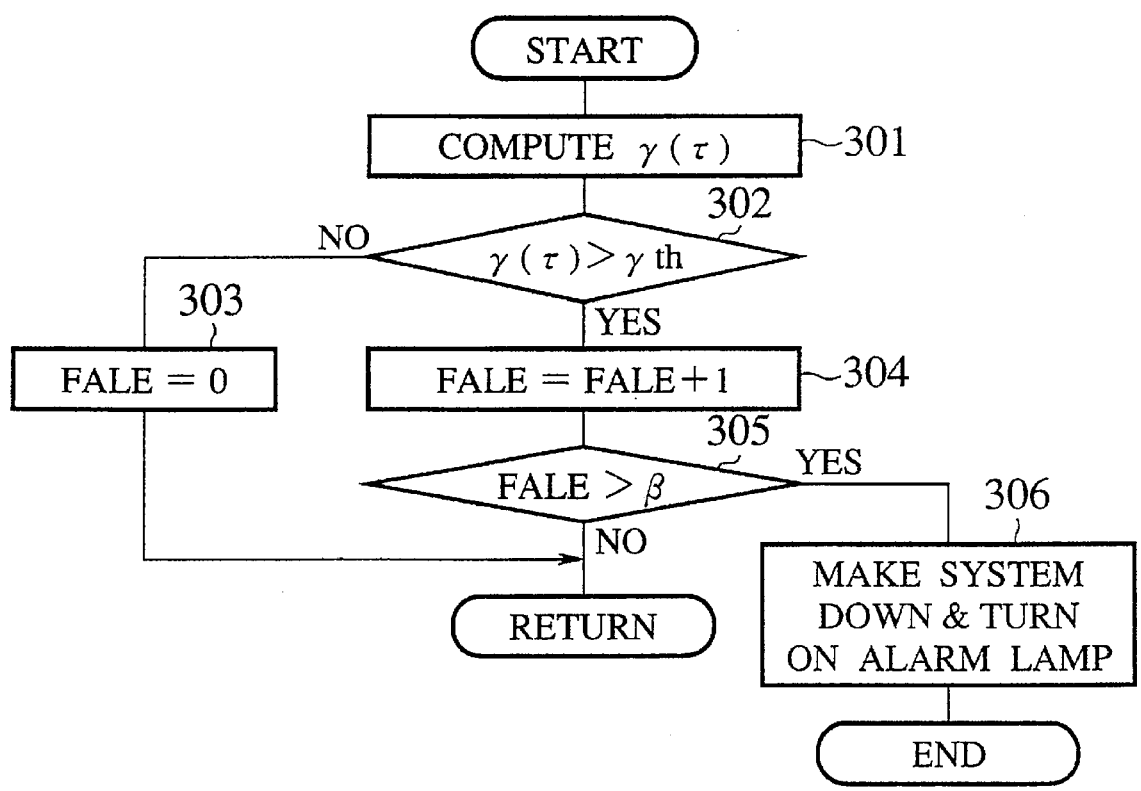
FIG. 9 is a flowchart of the abnormality detection process in the second embodiment.

FIG. 9 is a flowchart of an abnormality detection process similar to FIG. 5 of the first embodiment, but showing the second embodiment. Similarly to the first embodiment, this embodiment is a control type vibro-isolating support applied to an active engine mount. Because this embodiment has substantially the same setup except for the abnormality detection process as the first embodiment, the illustration and explanation of same are omitted.

Similarly to the first embodiment, it is judged if there is abnormality on the basis of residual vibration signal e. This embodiment differs, however, in that it is judged if abnormality is occurring on the basis of the auto-correlation function of residual vibration signal e.

If the abnormality detection process of this embodiment is started, it goes to the first step 301. At step 301, the auto-correlation function $\gamma(\tau)$ of residual vibration signal e stored at step 105 of the vibration damping process shown in FIG. 3 is computed. In computing the auto-correlation function $\gamma(\tau)$, the time lag $\tau$ is the period of reference signals x. Specifically, because the number of output times $T_y$ stored at step 112 of FIG. 3 represents the number of sampling times in one cycle of reference signals x, the time lag t may be $T_y$ ($\tau=T_y$).

Accordingly, the operation expression for the auto-correlation function $\gamma(\tau)$ is the following expression (2)

$$\gamma(\tau) = \sum_{i=0}^{T_y} e(i)e(i-T_y) \quad (2)$$

Step 301 for finding the auto-correlation function $\gamma(\tau)$ is followed by step 302. At step 302, it is judged if the auto-correlation function $\gamma(\tau)$ exceeds the threshold $\gamma_{th}$ by which the level of residual vibration signal e can be judged higher than a value when the vibration damping control is well executed. That is to say, in this embodiment, because the time lag $\tau$ of auto-correlation function $\gamma(\tau)$ equals the number of output times $T_y$, which is the period of reference signals x, the auto-correlation function $\gamma(\tau)$ computed with the expression (2) is large if the residual vibration signal e is periodic in synchronism with the reference signals x, and if the level of residual vibration signal e is high.

The cycle of reference signals x is nothing but the cycle of the engine vibration. If the auto-correlation function $\gamma(\tau)$ is large, the engine vibration is transmitted to the support member 35 side even though the vibration damping control is executed. In such a case, the engine mount 1 or something may probably be abnormal.

If the judgment at step 302 results in no, the process goes to step 303, where the counter FALE is zeroed. Thereafter, the abnormality detection process for this time ends. If the judgment at step 302 results in yes, the process goes to step 304, where the counter FALE is incremented. Next at step 305, it is judged if the count of counter FALE exceeds the specified value $\beta$.

If the judgment at step 305 results in no, the abnormality detection process ends as it is. If yes, the process goes to step 306, where the execution of the vibration damping process of FIG. 3 is inhibited to make the system down, and the alarm lamp 20B is turned on. If the judgment at step 302 results in yes, the process does not immediately go to step 306, in order to avoid falsely judging that abnormality is occurring when the auto-correlation function $\gamma(\tau)$ accidentally increases. This makes the abnormality detection process more reliable.

Thus, in this embodiment as well as the first embodiment, it can be judged if there is abnormality on the basis of residual vibration signal e. It is therefore possible, similarly to the first embodiment, to avoid the operation of an active engine mount which is abnormal. It is also possible to avoid false operation which may cause worse vibration or the like. It is thus possible to minimize the influence of abnormality.

With the setup of this embodiment, there is no need to find maximum values of residual vibration signal e. As apparent by comparing FIGS. 5 and 9, the process of this embodiment is simple as a whole. It is therefore possible to make the operation load less than in the first embodiment. This embodiment has other advantages similar to those of the first embodiment.

In computing the auto-correlation function $\gamma(\tau)$ in this embodiment, the time lag $\tau$ equals the number of output times $T_y$. Because the vibration generated by the engine 30 is periodic, however, the time lag $\tau$ may be an integral number of times (as large as) the number of output times $T_y$ ($\tau=2T_y, 3T_y, \ldots$).

In this embodiment, the processing at step 301 constitutes auto-correlation function operation means, while the processing at steps 302–305 constitutes abnormality judgment means.

Figure 10:
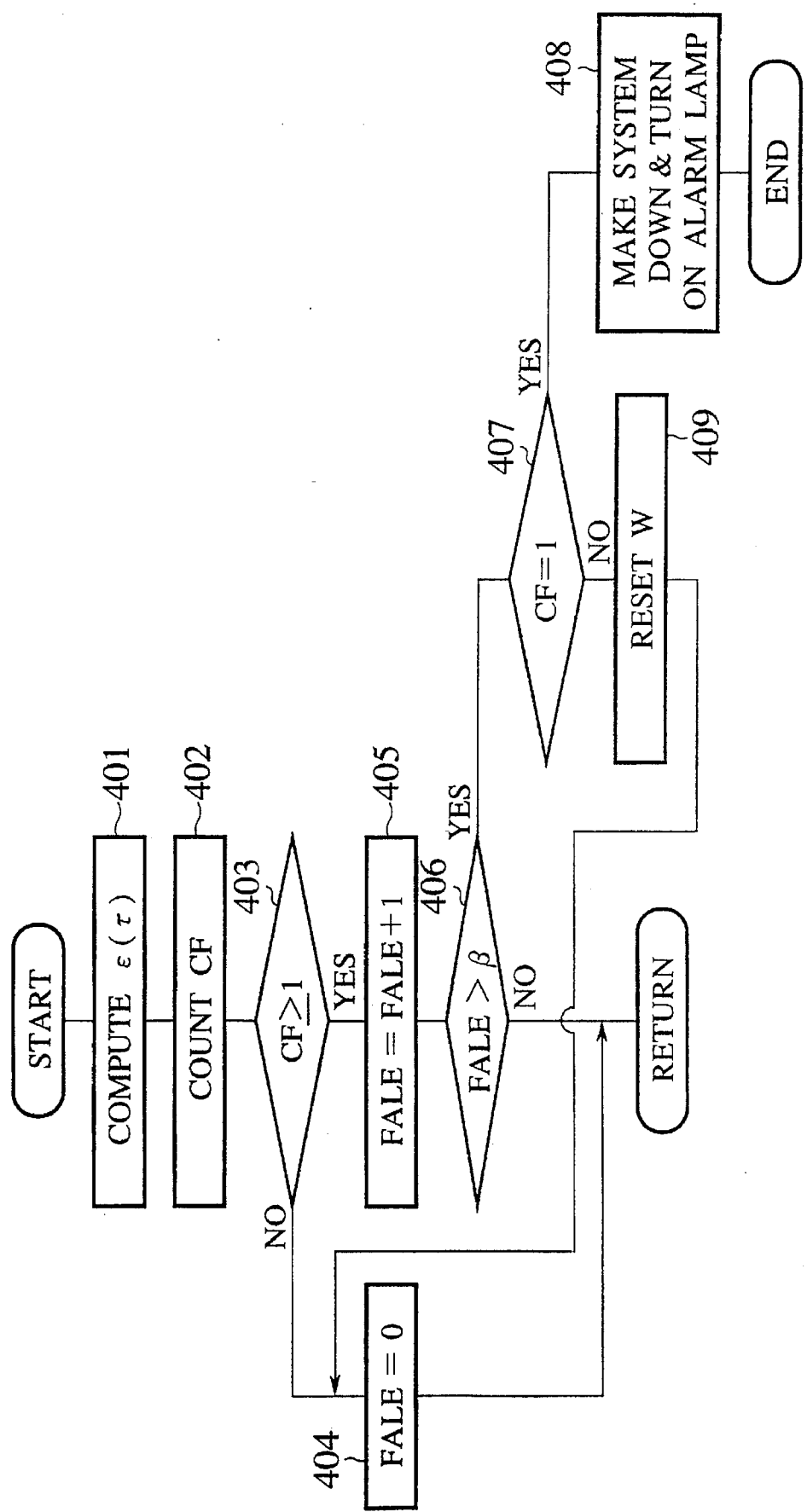
FIG. 10 is a flowchart of the abnormality detection process in the third embodiment.

FIG. 10 is a flowchart of an abnormality detection process similar to FIG. 5 of the first embodiment, but showing the third embodiment. Similarly to the first embodiment, this embodiment is a control type vibro-isolating support applied to an active engine mount. Because this embodiment has substantially the same setup except for the abnormality detection process as the first embodiment, the illustration and explanation of same are omitted.

Figure 11:
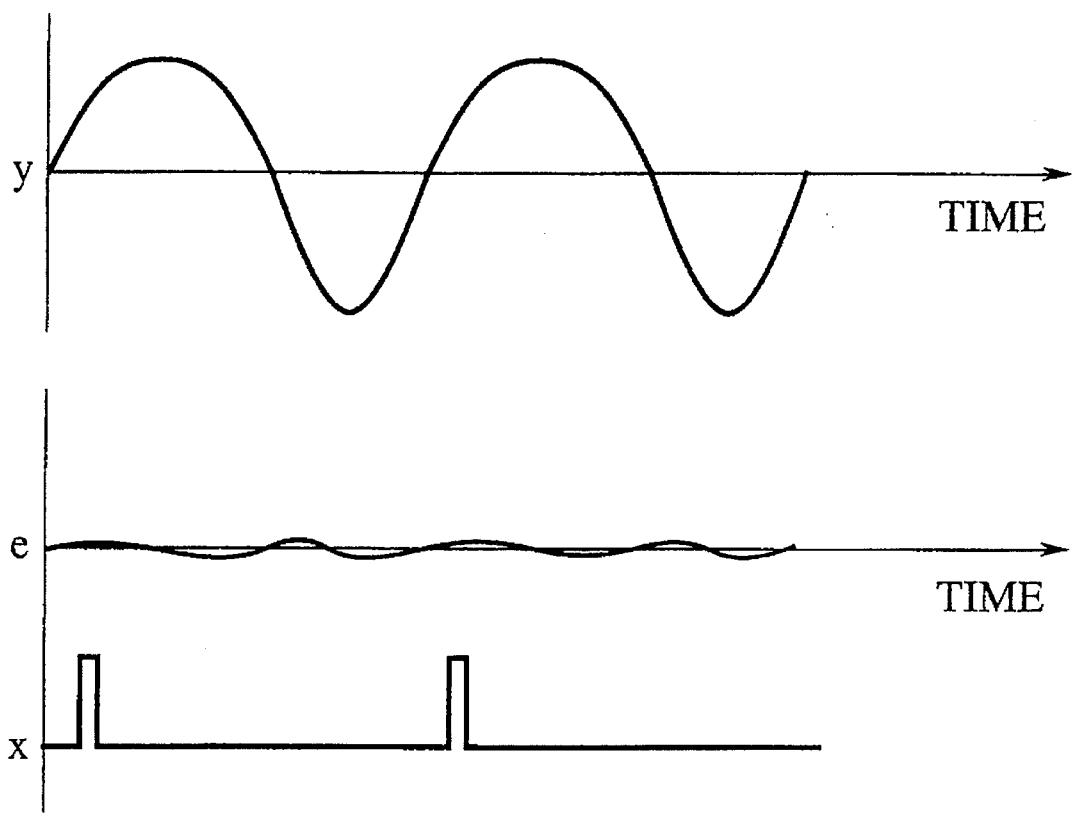
FIG. 11 shows wave forms of drive signal y, residual vibration signal e and reference signals x in the normal condition.
Figure 12:
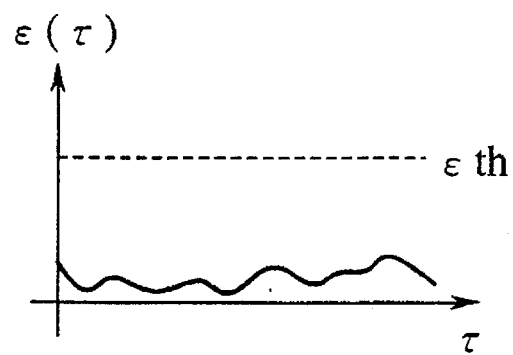
FIG. 12 shows the auto-correlation function of residual vibration signal e in the normal condition.

This embodiment is characterized in that it is judged if there is abnormality on the basis of the cross-correlation function of drive signal y and residual vibration signal e. In other words, if the vibration damping control is well executed, a periodic drive signal y is outputted in synchronism with the reference signals x, while a residual vibration signal e of a low level must be detected, as shown in FIG. 11, for example. The reason is that the vibration on the engine 30 side in synchronism with the reference signals x is canceled by the control vibration generated by the engine mount 1 in accordance with the drive signal y. Accordingly, the component of residual vibration signal e which is synchronous with the reference signal x must be small. In this case, as shown in FIG. 12, the cross-correlation function $\epsilon(\tau)$ of drive signal y and residual vibration signal e must be sufficiently small.

Figure 13:
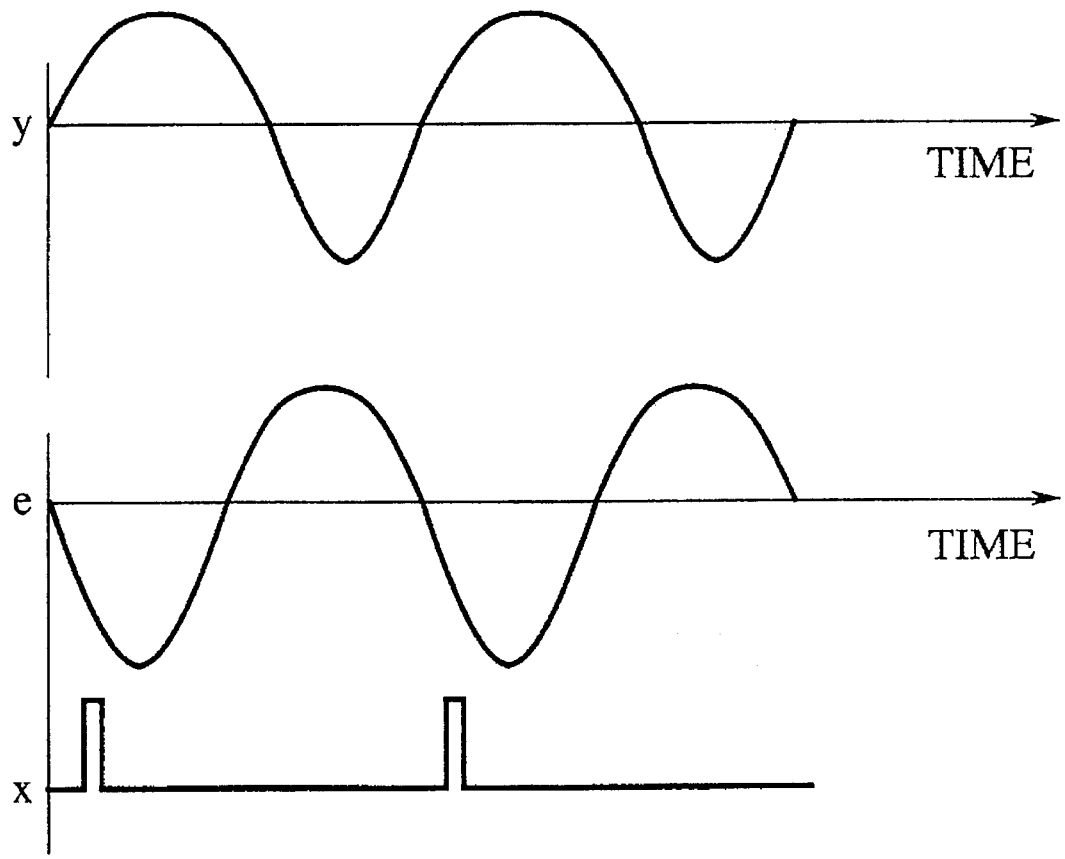
FIG. 13 shows wave forms of drive signal y, residual vibration signal e and reference signals x in the abnormal condition.
Figure 14:
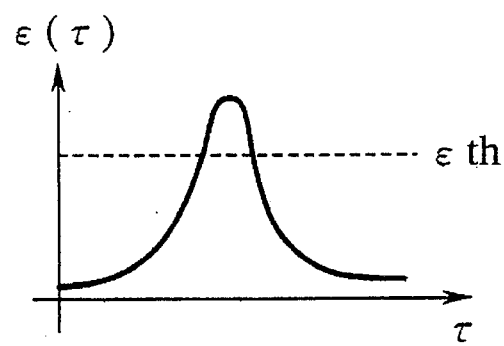
FIG. 14 shows the auto-correlation function of residual vibration signal e in the abnormal condition.

By contrast, if the vibration on the engine 30 side is transmitted to the support member 35 side because of trouble, degradation or other abnormality, even though the vibration damping control is executed, a drive signal y is outputted in synchronism with the reference signals x, while a residual vibration signal e must be detected, as shown in FIG. 13. The component of residual vibration signal e which is synchronous with the reference signals x has not been reduced. Therefore in this case, as shown in FIG. 14, the cross-correlation function $\epsilon(\tau)$ of drive signal y and residual vibration signal e has a peak value larger than the threshold $\epsilon_{th}$ by which the level of residual vibration signal e can be judged higher than a value when the vibration damping control is well executed.

From the above, it can be judged if there is abnormality on the basis of cross-correlation function $\epsilon(\tau)$.

If the abnormality detection process of this embodiment is started, it goes to the first step 401. At step 401, the cross-correlation function $\epsilon(\tau)$ of drive signal y outputted at step 104 of the vibration damping process of FIG. 3 and residual vibration signal e stored at step 105 is computed. The time lag $\tau$ ranges between zero and the number of output times $T_y$, which is the period of reference signals x($\tau=0$ to $T_y$). The operation expression for the cross-correlation function $\epsilon(\tau)$ is the following expression (3).

$$\epsilon(\tau) = \sum_{i=0}^{T_y} e(i)y(i-\tau) \quad (3)$$

Step 401 for finding the cross-correlation function $\epsilon(\tau)$ is followed by step 402. At step 402, it is counted how many peak values of cross-correlation function $\epsilon(\tau)$ which exceed the threshold $\epsilon_{th}$ exist within the range of $\tau=0$ to $T_y$, and where the result of count is stored as a number CF.

Next, the process goes to step 403, where it is judged if the number CF is 1 or more, that is to say, whether or not there is at least one peak value of cross-correlation function $\epsilon(\tau)$ which exceeds the threshold $\epsilon_{th}$. If not, the process goes to step 404, where the counter FALE is cleared. Thereafter, the abnormality detection process for this time ends. If yes, the process goes to step 405, where the counter FALE is incremented. Next at step 406, it is judged if the count of counter FALE exceeds the specified value β.

If the judgment at step 406 results in no, the abnormality detection process for this time ends as it is. If yes, the process goes to step 407, where it is judged if the number CF is 1.

If it is judged at step 407 that CF is one (CF=1), as shown in FIG. 13, there exists a residual vibration signal e having a strong component in synchronism with the reference signals x. It can therefore be judged that there is abnormality. Then, the process goes to step 408, where the execution of the vibration damping process of FIG. 3 is inhibited to make the system down, and the alarm lamp 20B is turned on.

Figure 15:
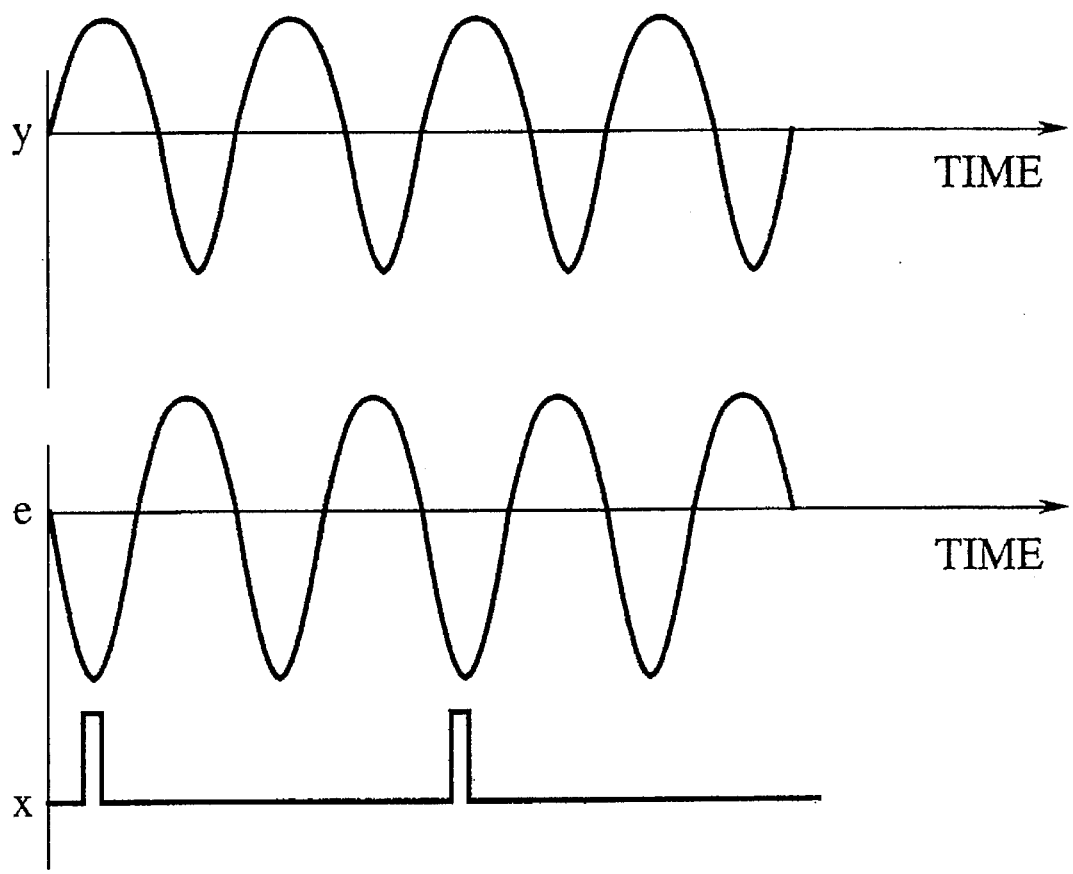
FIG. 15 shows wave forms of drive signal y, residual vibration signal e and reference signals x when higher-order divergence is occurring.
Figure 16:
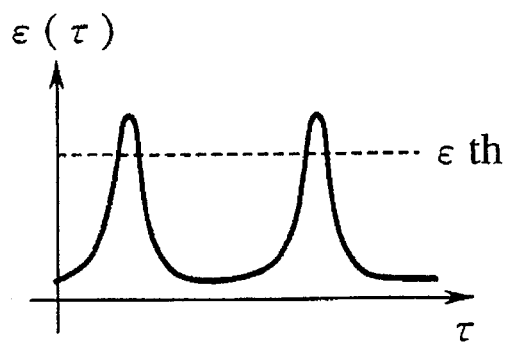
FIG. 16 shows the auto-correlation function of residual vibration signal e when higher-order divergence is occurring.

If the judgment at step 407 results in no, higher-order (multiple-frequency) divergence is occurring, where higher-order components of reference signals x exist in the drive signal y and residual vibration signal e, as shown in FIG. 15, for example. In such a case, the cross-correlation function $\epsilon(\tau)$ of drive signal y and residual vibration signal e has a plurality of (two in this case) peak values, as shown in FIG. 16.

The higher-order divergence is the divergence resulting from gradual growth of the higher-order components of reference signals x which exist in the adaptive digital filter W by the influence of the vibration or the like inputted from something but the engine 30. It can be considered that the higher-order divergence is not yet an essentially abnormal state.

In this embodiment, if the judgment at step 407 results in no, the process goes to step 409, where the filter factor $W_j$ of adaptive digital filter W is reset. Next at step 404, the counter FALE is cleared. Thereafter, the process returns to the process of FIG. 3. As a result, the vibration damping control is executed again with the higher-order divergence securely eliminated.

If the judgment at step 403 results in yes, the process does not immediately go to step 407, in order to avoid falsely judging that there is abnormality when the cross-correlation function $\epsilon(\tau)$ is accidentally large. This makes the abnormality detection process more reliable.

Thus, with the setup of this embodiment, it can be judged if there is abnormality on the basis of cross-correlation function $\epsilon(\tau)$. It is therefore possible to avoid the operation of an active engine mount which is abnormal similarly to the first embodiment. It is also possible to avoid false operation which may cause worse vibration or the like. It is thus possible to minimize the influence of abnormality.

With the setup of this embodiment, it is possible to judge higher-order divergence, which is slight abnormality. If there is such divergence, it is possible to eliminate the abnormality and execute the vibration damping control without needing to make the system down. It is therefore possible to continue the vibration damping control longer.

Even if the disturbance vibration generated by something but the engine 30 (for example, inputted from the road surface side) is transmitted to the support member 35, the cross-correlation function itself does not change. It is therefore easy to detect only abnormality. Other advantages are similar to those in the first embodiment.

In this embodiment, the processing at step 401 constitutes cross-correlation function operation means as state detection means. The processing at steps 402–407 constitute abnormality judgment means.

FIGS. 17–21 show the fourth embodiment, which is a control type vibro-isolating support applied to an active engine mount similarly to the first embodiment.

Figure 17:
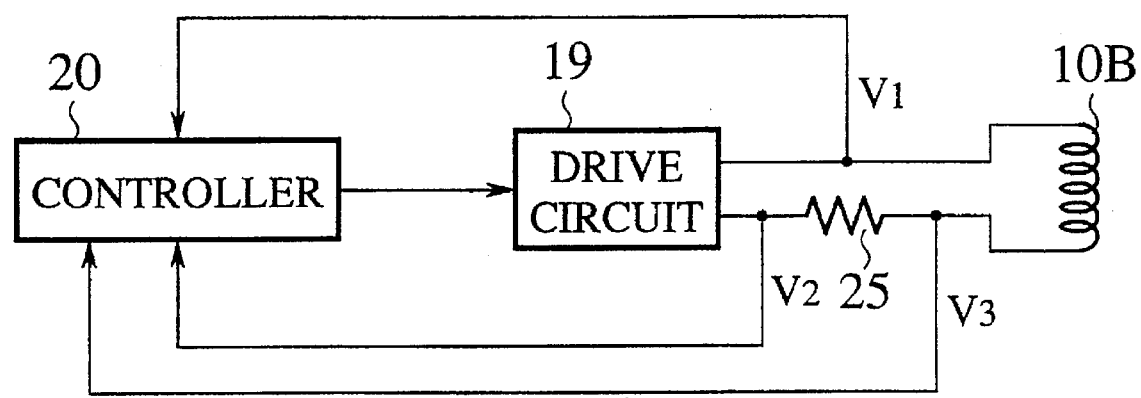
FIG. 17 is a circuit diagram showing important part of the setup of the fourth embodiment.

FIG. 17 is a circuit diagram showing the connection between the controller 20 and the drive circuit 19 for the exciting coil 10B. The drive circuit 19 and the coil 10B are interconnected through a resistor 25 for current detection, which is interposed between one terminal of the coil 10B and the drive circuit 19. The controller 20 is supplied with the voltage $V_1$ at the other terminal of the coil 10B and the voltages $V_2$ and $V_3$ at both terminals of resistor 25. The controller 20 reads the voltages $V_1$, $V_2$ and $V_3$ through an A/D converter (not shown) etc.

The abnormality detection process of this embodiment includes the first abnormality detection process immediately after the vehicle ignition switch is turned on, but before the vibration damping process of FIG. 3, and the second abnormality detection process as an interrupt process during the vibration damping process similarly to the first and other embodiments. The first abnormality detection process is for detection of trouble and degradation of engine mount 1. The second abnormality detection process is for detection of a hot state of electromagnetic actuator 10.

First, the first abnormality detection process is explained below. Immediately after the ignition switch is turned on, though vibration is inputted from the engine 30 into the engine mount 1, the vibration damping control is not executed. Therefore, the magnetic path member 12 is not positively displaced by the output of electromagnetic actuator 10. If the vibration is inputted from the engine 30 into the engine mount 1, however, the elastic body 6 elastically deforms, changing the volume of fluid chamber 15. The volume change is transmitted through the flat spring 11 and displaces the magnetic path member 12.

The displacement of magnetic path member 12, which is made of magnetizable material, induces a voltage between both terminals of exciting coil 10B. If the induced voltage (voltage induced under no control) is found, it can be judged that there is no disconnection or the like in at least the coil 10B. Contrariwise, if the voltage induced under no control is not found, it can be judged that the coil 10B is disconnected or otherwise abnormal.

If the clearance between the electromagnetic actuator 10 and magnetic path member 12 varies in size, the magnitude of the voltage induced under no control changes. Therefore, on the basis of this voltage, it is possible to acknowledge the clearance between the actuator 10 and the member 12.

Figure 18:
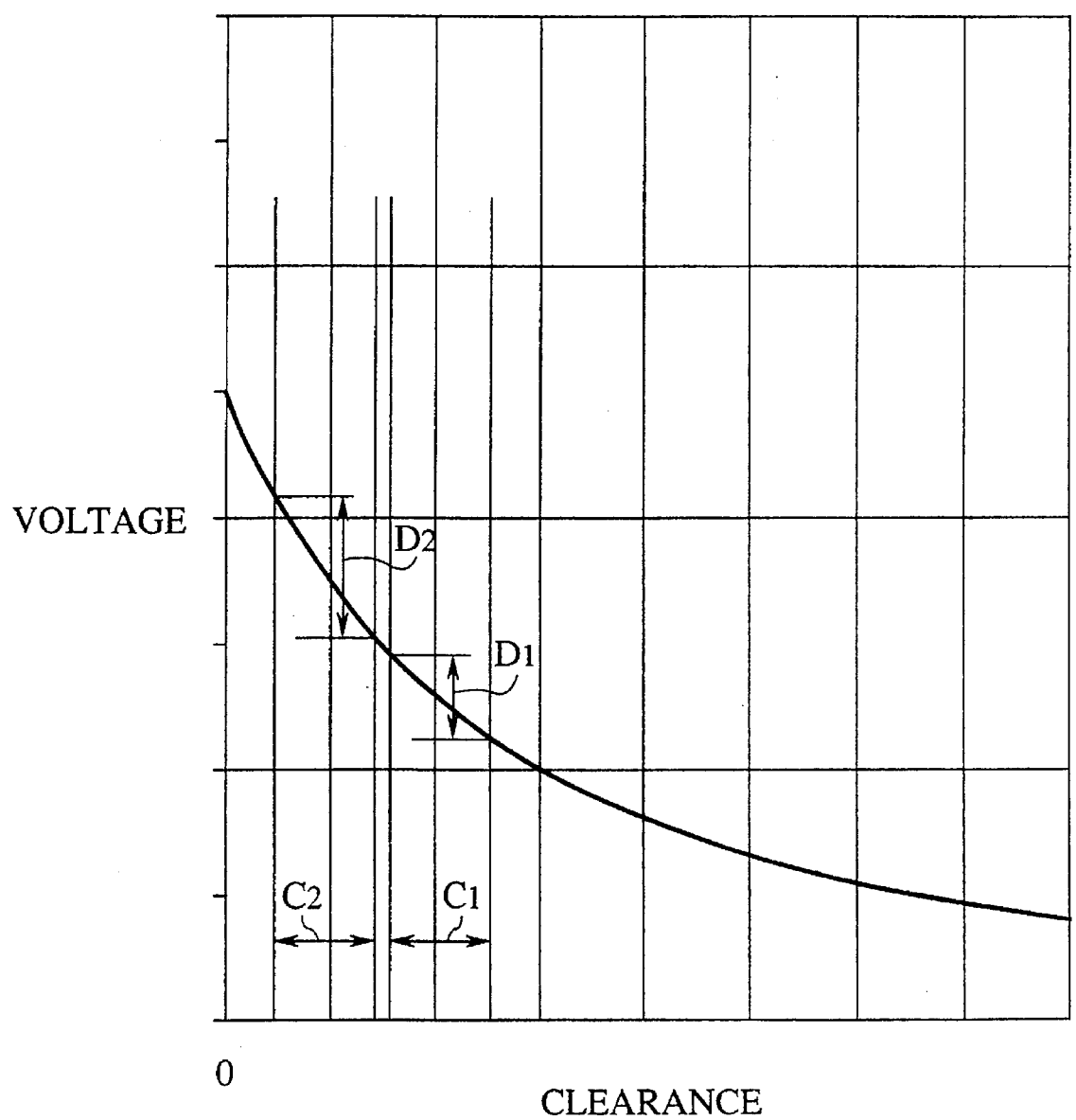
FIG. 18 is a graph showing the relation between the clearance between the electromagnetic actuator and the magnetic path member and the induced voltage.

Specifically, as shown in FIG. 18, where the abscissa represents the clearance between the electromagnetic actuator 10 and magnetic path member 12, while the ordinate represents the voltage induced in the exciting coil 10B, the induced voltage tends to be more steeply high as the clearance becomes smaller. For example, at its position where the clearance is comparatively large, the member 12 is displaced within a range C1, inducing voltage within a range D1. At its other position where the clearance is comparatively small, it is displaced within a range C2, inducing voltage within a range D2. If the displacement ranges C1 and C2 are the same, the voltage range D1 is smaller than D2. Therefore, on the basis of the maximum or minimum values, the amplitude ranges or the like of the induced voltages, it is possible to detect the state of the clearance between the actuator 10 and the member 12.

Figure 19:
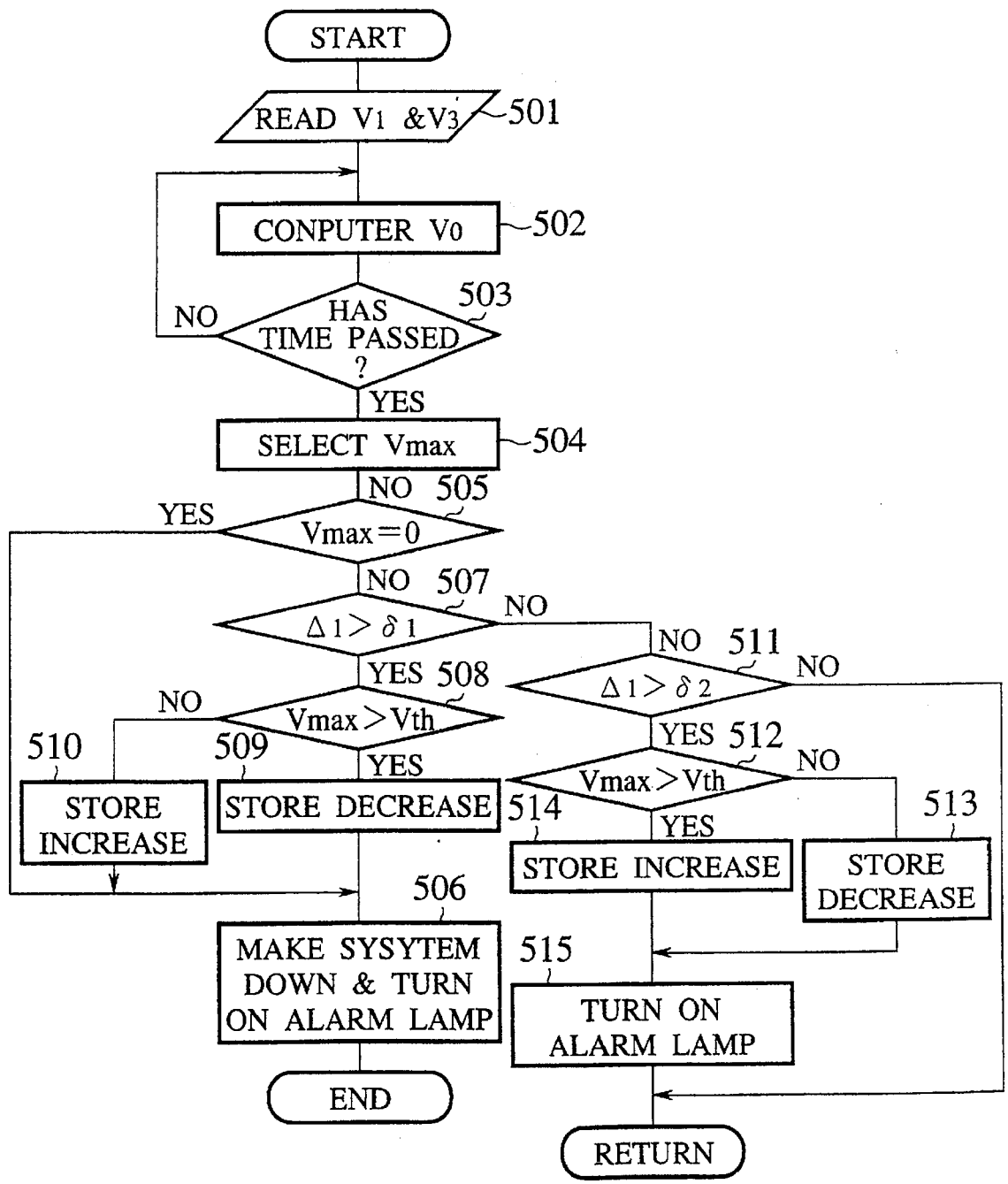
FIG. 19 is a flowchart of one of the abnormality detection processes in the fourth embodiment.

If the first abnormality detection process shown in FIG. 19 is started immediately after the ignition switch is turned on, but before the vibration damping control shown in FIG. 3 is executed, it goes to the first step 501. At step 501, the voltages $V_1$ and $V_3$ induced at both terminals of exciting coil 10B are read. Next at step 502, the voltage $V_0$ induced under no control is found. The voltage $V_0$ is the finite difference between the read voltages $V_1$ and $V_3$ ($V_0=|V_1-V_3|$). Next at step 503, it is judged if a specified time, which may be 1 second, for example, has passed after the process of FIG. 19 was started. Until the specified time has passed, steps 501 and 502 are repeated.

If the judgment at step 503 results in yes, the process goes to step 504, where the maximum value of the voltages $V_0$ found at step 502 is selected and stored as $V_{max}$. Otherwise, the maximum value $V_{max}$ may be selected by adding to step 502 a process for leaving the latest maximum voltage $V_0$.

Step 504 for finding the maximum value $V_{max}$ is followed by step 505, where it is judged if this value is zero ($V_{max}=0$). If it is judged that the value is zero, voltage has not been induced at the exciting coil 10B, even though it should have been, or any voltage induced there has not been detected or found as terminal voltage. It can therefore be judged that there is occurring such abnormality that the fluid in the fluid chamber 15 is leaking out, so that the volume of the chamber 15 does not change even though the elastic body 6 deforms, or such trouble that the coil 10B is disconnected.

If the judgment at step 505 results in yes, the process goes to step 506, where the execution of the vibration damping process of FIG. 3 is inhibited to make the system down, and the alarm lamp 20B is turned on.

If the judgment at step 505 results in no, it can be judged that at least such abnormality as mentioned above is not occurring. Then, the process goes to step 507 for judging if other abnormality or degradation is not occurring.

At step 507, it is judged if a specified value $\delta_1$ is exceeded by the finite difference $\Delta_1$ between the maximum value $V_{max}$ and a specified value $V_{th}$ ($\Delta_1=|V_{max}-V_{th}|$). The value $V_{th}$ is the maximum value of the voltages induced under no control when the clearance between the electromagnetic actuator 10 and magnetic path member 12 is a proper value. The specified value $\delta_1$ is a value by which it can be judged if the clearance between the actuator 10 and the member 12 greatly differs from a proper value. The value $\delta_1$ can be found experimentally with an actual engine mount.

Therefore, if the judgment at step 507 results in yes, it may be considered that the magnetic path member 12 has greatly approached the electromagnetic actuator 10 away from its initial position, because the flat spring 11 supporting the member 12 has stretched due to its repeated deformation, or that the neutral position of the member 12 has moved far away from the actuator 10, because the permanent magnet 10C has been demagnetized by something. In any case, this is an abnormal condition, where the engine mount 1 cannot operate normally. If the judgment at step 507 results in yes, the process proceeds toward step 506. Before step 506, however, the process goes to step 508, where it is judged if the maximum value $V_{max}$ exceeds the specified value $V_{th}$.

Step 508 is a process for confirming whether the abnormality is decrease or increase in the clearance between the electromagnetic actuator 10 and magnetic path member 12, and storing the confirmed direction of abnormality in the storage region of controller 20 from which read can be made, for later analysis of trouble. As already explained with reference to FIG. 18, the induced voltage becomes higher as the clearance becomes narrower. Therefore, if the judgment at step 508 results in yes, it can be judged that the clearance is narrower. Then, the process goes to step 509, where it is stored that the abnormality is decrease in the clearance. If the judgment at step 508 results in no, it can be judged that the clearance is wider. Then, the process goes to step 510, where it is stored that the abnormality is increase in the clearance. Steps 509 and 510 are followed by step 506, where the execution of the vibration damping process of FIG. 3 is inhibited to make the system down, and the alarm lamp 20B is turned on.

If the judgment at step 507 results in no, there is no such abnormality that the clearance has extremely varied, but there may be such degradation that the clearance has varied. Then, the process goes to step 511, where it is judged if the finite difference $\Delta_1$ exceeds a specified value $\delta_2$, which is smaller than the specified value $\delta_1$. $\delta_2$ is a value by which it can be judged if the clearance between the electromagnetic actuator 10 and magnetic path member 12 is so different from a proper value as to somewhat affect the vibration damping control. Similarly to $\delta_1$, $\delta_2$ can be found experimentally with an actual engine mount.

If the judgment at step 511 results in no, it can be judged that the clearance is kept a proper value. This means that no particular degradation could be acknowledged. Then, the first abnormality detection process ends as it is, and is followed by the vibration damping process of FIG. 3.

If the judgment at step 511 results in yes, it can be judged that the clearance has not reached an abnormal level, but has varied to such a degree as to somewhat affect the vibration damping control. Then, the process proceeds through steps 512 and 513 or 514 to step 515. The process of steps 512–514 is similar to that of steps 508–510. At step 515, the alarm lamp is turned on (or blinked for distinction from abnormality) without making the system down. The driver or the operator making periodic inspection can thus be warned that there is degradation. Thereafter, the first abnormality detection process ends, and is followed by the vibration damping process of FIG. 3.

The second abnormality detection process is explained below. When high frequency current drives the exciting coil 10B of electromagnetic actuator 10, which is used as a driving source in the engine mount 1, an eddy current flows in the magnetic path member 12, so that the impedance of the coil 10B becomes high. The frequency of the current flowing through the coil 10B depends on the rotating speed of engine 30. Accordingly, if the input voltage is constant, the maximum value of the current flowing through the coil 10B is definite. Also, if the temperature of the coil 10B rises, increasing its impedance, the maximum value of the current flowing through the coil 10B tends to lower.

It is therefore possible to judge if the electromagnetic actuator 10 including the exciting coil 10B is hot, by detecting the maximum value of the current flowing actually through the coil 10B, and comparing this value with a threshold, which is the theoretically maximum current value determined by the engine speed.

Figure 20:
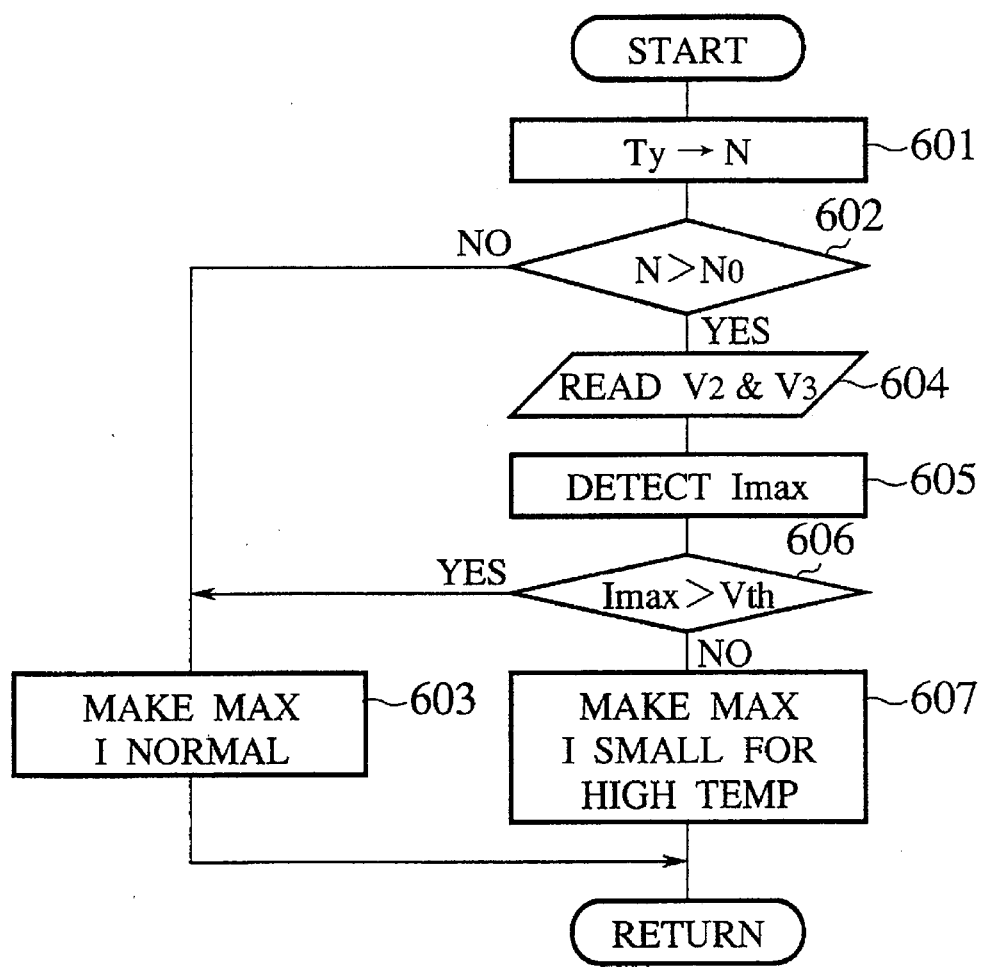
FIG. 20 is a flowchart of the other abnormality detection process in the fourth embodiment.

The second abnormality detection process shown in FIG. 20 is executed as an interrupt process immediately after step 112 of the vibration damping control shown in FIG. 3. First at step 601, the engine speed N (rpm) is found on the basis of the number of output times $T_y$, which is the period of reference signals x, and the sampling time. Next at step 602, it is judged if the engine speed N exceeds a specified value $N_0$, which may be 3,000 (rpm), for example. The value $N_0$ is used to judge if the engine speed N is so high that the eddy current flowing in the magnetic path member 12 affects the impedance of exciting coil 10B.

If the judgment at step 602 results in no, it can be judged that the electromagnetic actuator 10 is not made particularly hot. Then, the process goes to step 603, where the limit value $I_L$ which is the maximum value of the control current I used in the vibration damping process explained later is adjusted to a normal value. Thereafter, the second abnormality detection process for this time ends.

If the judgment at step 602 results in yes, the process goes to step 604, where the voltages $V_2$ and $V_3$ at both terminals of the resistor 25 shown in FIG. 17 are read. Next at step 605, the control current $I_0$ actually flowing through the exciting coil 10B is computed on the basis of the voltages $V_2$ and $V_3$ and the resistance $R_1$ of resistor 25 ($I_0=|V_2-V_3|/R_1$), and then the maximum value $I_{max}$ of control current $I_0$ is found. Actually, the control current $I_0$ varies sinusoidally like the drive signal y. Accordingly, in order to find the maximum value $I_{max}$, there is a need to detect the control current $I_0$ for the time corresponding to at least half the period of drive signal y. It is therefore desirable to execute steps 604 and 605 constantly following the step 111 of FIG. 3, for example.

Step 605 for finding the maximum value $I_{max}$ is followed by step 606, where it is judged if this value $I_{max}$ exceeds a threshold $I_{th}$. $I_{th}$ is a value somewhat (about 10%, for example) smaller than the maximum value of the current which can flow when the electromagnetic actuator 10 is not hot. The threshold $I_{th}$ depends on the engine speed N as shown below in Table 1, for example.

TABLE 1

| N (rpm) | ~3200 | ~3400 | ~3600 | ~3800 | ~4000 | ~4200 | ~4400 |
|---|---|---|---|---|---|---|---|
| $V_{th}$ | 3.2 | 3.1 | 3.0 | 2.9 | 2.9 | 3.0 | 2.9 |

If the judgment at step 606 results in yes, sufficiently large control current I is flowing. It can therefore be judged that the impedance of exciting coil 10B is not very high, that is to say, the electromagnetic actuator 10 is not hot. Then, after going through step 603, the second abnormality detection process for this time ends.

If the judgment at step 606 results in no, it is not possible for the control current I to increase. It can therefore be judged that the impedance of the coil 10B is high, that is to say, the actuator 10 is hot. Then, the process goes to step 607, where the limit value $I_L$ is adjusted to a value at high temperature, which is smaller than the normal value set at step 603. Thereafter, the second abnormality detection process for this time ends.

Figure 21:
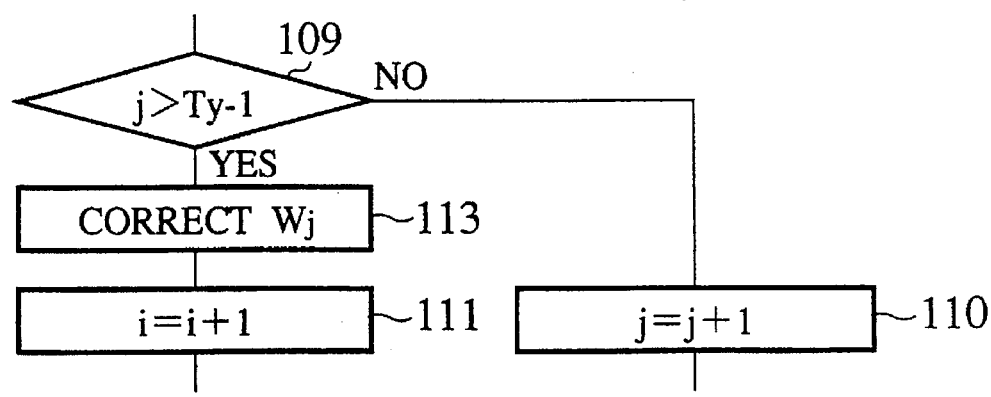
FIG. 21 is a flowchart of a modification of the vibration damping process in the fourth embodiment.

The vibration damping process in this embodiment is basically that shown in FIG. 3 similarly to the first and other embodiments. As shown in FIG. 21, however, this process includes, between steps 109 and 111, another step 113 for correcting the filter factor $W_j$ of adaptive digital filter W. Specifically, at step 113, each filter factor $W_j$ outputted as a drive signal y is corrected so as to decrease at a constant rate, in order for the maximum value of control current I not to exceed the limit value $I_L$, on the basis of the relation between the drive signal y and control current I.

Thus, immediately after the engine 30 is started, the first abnormality detection process shown in FIG. 19 is executed.

During the vibration damping process, the second abnormality detection process shown in FIG. 20 is executed.

By executing the first abnormality detection process, it is possible to detect disconnection in the engine mount 1 and abnormal or degraded clearance between the electromagnetic actuator 10 and magnetic path member 12. Thereagainst, proper steps are taken. Therefore, similarly to the first and other embodiments, it is possible to avoid the operation of an active engine mount which is abnormal. It is also possible to avoid false operation which may cause worse vibration or the like. It is thus possible to minimize the influence of abnormality.

In accordance with the first abnormality detection process, it can be detected or judged, without needing a new sensor etc., whether there is disconnection or not, whether the clearance between the electromagnetic actuator 10 and magnetic path member 12 has varied or not, and whether such variation, if any, is large or small. Because the operation process is not particularly complex, the costs will not greatly increase and the apparatus will not be enlarged. This is, similarly to the first embodiment, very desirable for a vehicle with a greatly limited mounting space.

In accordance with the second abnormality detection process, it can be detected if the electromagnetic actuator 10 is hot. If a high temperature condition is detected, the limit value $I_L$ is adjusted at step 607 so as to be smaller than normal. This positively lowers the maximum value of control current I when the vibration damping process is executed. Accordingly, the high temperature condition of the actuator 10 is prevented from being worse or is normalized. It is therefore possible to avoid abnormality occurring in the actuator 10 due to high temperature. If the high temperature condition of the actuator 10 is eliminated, and the judgment at step 606 results in yes again, the process of step 603 is executed to restore the normal control condition. Therefore, the maximum value of control current I is limited during the minimum time required. In other words, it is possible to minimize the drop in vibration damping effect due to the limitation of the maximum value of control current I.

When the first abnormality detection process is executed, the clearance variation is judged on the basis of the maximum value $V_{max}$ of voltage $V_O$ induced under no control and the specified value $V_{th}$, which is the maximum value of the voltage induced under no control when the clearance is a proper value. Otherwise, the clearance variation may be judged on the basis of the minimum value of the voltage $V_O$ and the minimum value of the voltage induced under no control when the clearance is a proper value.

In this embodiment, the processing at steps 501–504 constitutes clearance detection means and induced voltage detection means as state detection means. The processing at steps 604 and 605 constitutes maximum current value detection means. The processing at steps 607 and 113 constitutes control current correction means. The processing at step 505, the processing at steps 507–514 and the processing at step 606 constitute abnormality judgment means.

In each of the embodiments, the control type vibro-isolating support is applied to the engine mount 1 supporting the engine 30. However, a control type vibro-isolating support according to the present invention is not limitedly applied to an engine mount, but may otherwise be a vibro-isolating support for a vibratory machine tool.

The setups of the embodiments may be used either independently or in combination. A combination of setups results in a complex or synthetic advantage, which is a combination of advantages of embodiments.

In each embodiment, a drive signal y is generated in accordance with synchronous filtered X LMS algorithm.

The applicable algorithm, however, is not limited to this algorithm, but may be normal filtered X LMS algorithm or frequency-domain LMS algorithm, for example. If the system characteristics are stable, a drive signal y may be generated by a digital filter with a fixed factor or an analog filter, and only its phase may be varied to make the residual vibration signal e smaller, without using LMS algorithm or other adaptive algorithm.

In each embodiment, a vibro-isolating support of the type filled with fluid is used as a source of control vibration. The type of the source of control vibration, however, is not limited to this, but may be that with a piezoelectric actuator or the like.

In each embodiment, while low frequency vibration is inputted, vibration isolation is effected by the fluid resonance generated when the fluid flows through the orifices 5a. For a vibro-isolating support supporting a vibrator into which no such low frequency vibration is inputted, there is no need of orifice-defining body 5, diaphragm 4, etc. As a result, the number of parts is reduced, so that the costs are low.

Figure 2:
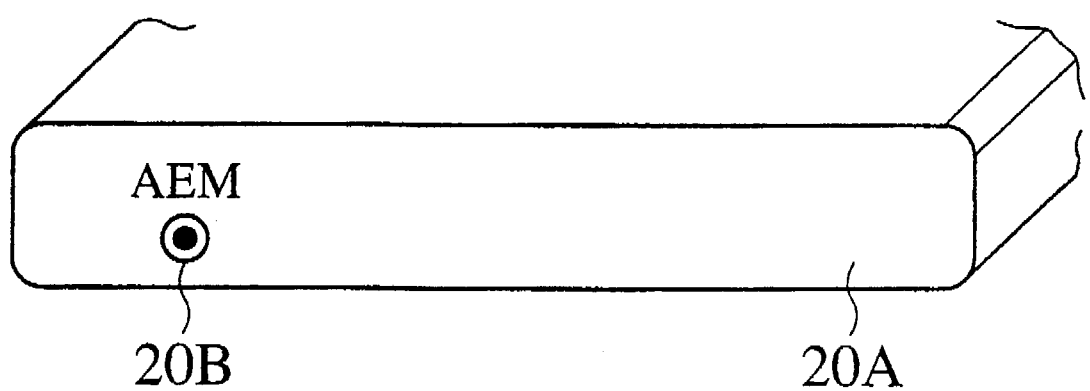
FIG. 2 is a fragmentary perspective view of the controller, showing an example of the alarm.

In each embodiment, the alarm lamp 20B which is an LED lamp as shown in FIG. 2 is used as the alarm raising means. The alarm raising means, however is not limited to this lamp, but may be an alarm lamp fitted on a dash panel, an alarm device sounding like a buzzer, or a combination of them.

In the fourth embodiment, it is based on the voltage $V_0$ induced under no control to judge variation of the clearance between the electromagnetic actuator 10 and magnetic path member 12. Otherwise, however, the clearance may be measured directly by means such as a gap sensor, which is fitted between the actuator 10 and the member 12.

According to the first invention, as explained above, it is possible to recognize trouble, degradation or other abnormality, if any, in a control type vibro-isolating support being used. For example, the apparatus can be positively stopped before it is completely out of order. It is therefore possible to make the apparatus more reliable when the apparatus is actually used, without greatly raising the costs.

According to the second invention, it is possible to warn that abnormality has occurred. The operator or the like making periodic inspection, for example, can therefore securely recognize that abnormality has occurred.

According to the third invention through the 11th invention, it is possible to judge if there is abnormality by detecting the state/s of the residual vibration signal and/or the drive signal. It is therefore avoidable that the apparatus is enlarged and that the costs greatly increase.

In particular, according to the 6th invention, it is possible to securely distinguish the condition where most of the vibration of the vibrator is not damped, but transmitted to the support body side, even though the vibration damping control is executed. It is therefore possible to more precisely judge if there is abnormality.

According to the 9th invention, the abnormality judgment means can easily judge if there is abnormality, because the vibration generated by something but the vibrator and inputted into the support body does not influence the cross-correlation function of the residual vibration signal and the drive signal.

According to the 11th invention, the abnormality judgment means can judge if there is higher-order divergence. It is therefore possible to take proper measures depending on the degree of abnormality.

According to the 12th invention, it is possible to recognize abnormality, if any, in the source of control vibration of the type filled with fluid when the source is used. For example, the apparatus can be positively stopped before it is completely out of order. It is therefore possible to make the apparatus more reliable when the apparatus is actually used, without largely increasing the costs.

According to the 13th invention, it is possible to recognize change, if any, in the clearance between the movable member and electromagnetic actuator while the apparatus is used. It is therefore avoidable to execute the vibration damping control in the condition where the clearance has largely changed from its proper value.

According to the 14th invention, the clearance between the movable member and electromagnetic actuator is detected with the induced voltage of the exciting coil. It is therefore avoidable to enlarge the apparatus and largely increase the costs.

According to the 15th invention and 16th invention, it is possible to distinguish the direction of the change in the clearance between the movable member and electromagnetic actuator. This can provide useful information for later analysis of trouble, etc.

According to the 17th invention, it is easy to judge if there is disconnection or other abnormality in the circuit including the exciting coil of the electromagnetic actuator.

According to the 18th invention, it is easy to judge if the electromagnetic actuator, inclusive of the exciting coil, is hot.

In particular, according to the 19th invention, either it is avoidable that the electromagnetic actuator becomes even hotter, or it is possible to make the actuator out of its hot state. It is therefore avoidable that the actuator becomes abnormal due to its high temperature.

According to the 20th invention, the apparatus may also operate as an ordinary vibro-isolating support of the type filled with fluid, which generates passive supporting force. It is therefore possible to effectively damp various vibrations.

What is claimed is:

1. A control type vibro-isolating support, comprising:
   a source of control vibration which is interposed between a vibrator and a support body, and which can generate control vibration;
   reference signal generation means for detecting the state of the vibration being generated by said vibrator, and for outputting a reference signal;
   residual vibration detection means for detecting residual vibration on said support body side; and for outputting a residual vibration signal;
   control means for generating a drive signal for driving said source of control vibration on the basis of said reference signal and said residual vibration signal so as to damp the vibration on said support body side;
   state detection means for detecting the state of said vibro-isolating support; and
   abnormality judgment means for judging if there is abnormality on the basis of the detection result of said state detection means.

2. The vibro-isolating support claimed in claim 1, and further comprising alarm raising means for raising an alarm if said abnormality judgment means judges abnormality occurring.

3. The vibro-isolating support claimed in claim 1, wherein said vibrator generates periodic vibration.

4. The vibro-isolating support claimed in claim 3, wherein:
   said state detection means comprises maximum/minimum detection means for detecting the maximum or minimum value of said residual vibration signal for each cycle of said reference signal, and wherein said abnormality judgment means judges if there is abnormality on the basis of the magnitude of said maximum or minimum value and the intervals at which the maximum or minimum values of said residual vibration signal have occurred for a plurality of cycles of said reference signal.

5. The vibro-isolating support claimed in claim 4, wherein: said abnormality judgment means judges abnormality occurring if the modulus of said maximum or minimum value exceeds a specified threshold and if said maximum or minimum values have periodically occurred.

6. The vibro-isolating support claimed in claim 4, wherein: said abnormality judgment means judges abnormality occurring if the modulus of said maximum or minimum value exceeds a specified threshold and if said maximum or minimum values have occurred at the same cycle as said reference signal.

7. The vibro-isolating support claimed in claim 3, wherein:

said state detection means comprises auto-correlation function operation means for finding the auto-correlation function of said residual vibration signal with a time lag which is an integral number of times as long as the period of said reference signal, and wherein said abnormality judgment means judges if there is abnormality on the basis of said auto-correlation function.

8. The vibro-isolating support claimed in claim 7, wherein: said abnormality judgment means judges abnormality occurring if said auto-correlation function exceeds a specified threshold.

9. The vibro-isolating support claimed in claim 3, wherein:

said state detection means comprises cross-correlation function operation means for finding the cross-correlation function of said residual vibration signal and said drive signal, and wherein said abnormality judgment means judges if there is abnormality on the basis of said cross-correlation function.

10. The vibro-isolating support claimed in claim 9, wherein: said abnormality judgment means judges abnormality occurring if said cross-correlation function exceeds a specified threshold.

11. The vibro-isolating support claimed in claim 9, wherein: said abnormality judgment means judges abnormality occurring, which is higher-order divergence, if said cross-correlation function exceeds a specified threshold at a plurality of points within a time lag of which the maximum value is the period of said reference signal.

12. The vibro-isolating support claimed in claim 1, wherein: said source of control vibration comprises a supporting elastic body interposed between said vibrator and said support body, a diaphragm, a movable member which can be magnetized and is elastically supported so as to form part of said diaphragm, a fluid chamber defined at least partially by said supporting elastic body and said diaphragm, fluid in said chamber, and an electromagnetic actuator for operation in response to said drive signal to displace said movable member so as to change the volume of said chamber.

13. The vibro-isolating support claimed in claim 12, wherein: said state detection means comprises clearance detection means for detecting the clearance between said movable member and said electromagnetic actuator, and wherein said abnormality judgment means judges if said source of control vibration is abnormal on the basis of said clearance.

14. The vibro-isolating support claimed in claim 13, wherein: said electromagnetic actuator includes an exciting coil, and wherein said clearance detection means comprises induced voltage detection means for detecting voltage induced under no control in said coil if said vibrator vibrates and if said actuator is not supplied with said drive signal.

15. The vibro-isolating support claimed in claim 14, wherein: said abnormality judgment means judges that abnormality has occurred, which is decrease in said clearance, in said source of control vibration if the maximum or minimum value of said voltage induced under no control exceeds a specified value.

16. The vibro-isolating support claimed in claim 14, wherein: said abnormality judgment means judges that abnormality has occurred, which is increase in said clearance, in said source of control vibration if the maximum or minimum value of said voltage induced under no control is less than a specified value.

17. The vibro-isolating support claimed in claim 12, wherein: said electromagnetic actuator comprises an exciting coil, and wherein said state detection means comprises induced voltage detection means for detecting voltage induced under no control in said coil if said vibrator vibrates and if said actuator is not supplied with said drive signal, said abnormality judgment means judging said source of control vibration abnormal if said voltage induced under no control is zero.

18. The vibro-isolating support claimed in claim 12, wherein: said electromagnetic actuator includes an exciting coil, and wherein said state detection means comprises maximum current value detection means for detecting the maximum value of the control current actually flowing through said coil, said abnormality judgment means judging said actuator in a high temperature state if the maximum value of said control current is less than a specified threshold.

19. The vibro-isolating support claimed in claim 18, and further comprising: control current correction means for lowering the maximum value of said control current if said abnormality judgment means judges said electromagnetic actuator in a high temperature state.

20. The vibro-isolating support claimed in claim 12, wherein: said source of control vibration has an orifice and an auxiliary fluid chamber of variable volume, which communicates through said orifice with the first-mentioned fluid chamber, and wherein said chambers and said orifice are filled with said fluid.

* * * * *